U S010393590B2

(12) United States Patent
Fadell et al.

(10) Patent No.: US 10,393,590 B2
(45) Date of Patent: *Aug. 27, 2019

(54) HOME MONITORING AND CONTROL SYSTEM

(71) Applicant: GOOGLE LLC, Mountain View, CA (US)

(72) Inventors: Anthony M. Fadell, Palo Alto, CA (US); Matthew L. Rogers, Palo Alto, CA (US); Yoky Matsuoka, Palo Alto, CA (US); David Sloo, Palo Alto, CA (US); Maxime Veron, Palo Alto, CA (US); Isabel I. Guenette, Palo Alto, CA (US); Shigefumi Honjo, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/972,750

(22) Filed: May 7, 2018

(65) Prior Publication Data
US 2018/0252589 A1    Sep. 6, 2018

Related U.S. Application Data

(63) Continuation of application No. 14/430,124, filed as application No. PCT/US2013/061021 on Sep. 20, 2013, now Pat. No. 9,964,447.
(Continued)

(51) Int. Cl.
G01J 5/08    (2006.01)
G01J 5/04    (2006.01)
(Continued)

(52) U.S. Cl.
CPC ............. G01J 5/0806 (2013.01); G01J 5/025 (2013.01); G01J 5/041 (2013.01);
(Continued)

(58) Field of Classification Search
CPC .... G08B 17/00; G08B 13/193; G08B 17/113; G08B 17/11; G08B 17/10; H05B 37/0272;
(Continued)

(56) References Cited

U.S. PATENT DOCUMENTS 7,193,644 B2    3/2007 Carter
7,429,924 B2    9/2008 Langer et al.
(Continued)

FOREIGN PATENT DOCUMENTS

CN    101728727    6/2010
CN    201674472    12/2010
(Continued)

OTHER PUBLICATIONS

Extended European Search Report dated Feb. 3, 2016, for European Patent Application No. 13839713.8, 7 pages.
(Continued)

*Primary Examiner* — Melur Ramakrishnaiah
(74) *Attorney, Agent, or Firm* — Morgan, Lewis & Bockius LLP

(57) ABSTRACT

This application is directed to a home monitoring and control system including a doorbell installed at a door of a home, an application executable by a monitoring device, and a remote server. The doorbell has a button configured to, upon being touched, depressed or activated, wirelessly cause an audio speaker of an electronic device to sound an audible notification or a message to be sent to the monitoring device to indicate presence of a person at the door. The doorbell also has a camera configured to capture video data within a
(Continued)

field of view. The remote server is configured to receive from the doorbell the video data and the message, and relay them to the monitoring device. The application is configured to receive and display at least a portion of the video data captured by the camera of the doorbell.

20 Claims, 13 Drawing Sheets

Related U.S. Application Data

(60) Provisional application No. 61/704,437, filed on Sep. 21, 2012.

(51) Int. Cl.
| | |
|---|---|
| G08B 17/00 | (2006.01) |
| G01J 5/02 | (2006.01) |
| G06K 9/00 | (2006.01) |
| H04L 12/28 | (2006.01) |
| H01H 9/02 | (2006.01) |
| H02J 13/00 | (2006.01) |
| H05B 37/02 | (2006.01) |
| G08B 17/11 | (2006.01) |
| G08B 17/10 | (2006.01) |
| G08B 13/193 | (2006.01) |
| G08B 17/113 | (2006.01) |

(52) U.S. Cl.
CPC ......... *G06K 9/00369* (2013.01); *G08B 17/00* (2013.01); *H01H 9/02* (2013.01); *H02J 13/0013* (2013.01); *H04L 12/282* (2013.01); *H05B 37/0272* (2013.01); *G08B 13/193* (2013.01); *G08B 17/10* (2013.01); *G08B 17/11* (2013.01); *G08B 17/113* (2013.01); *Y10T 29/49002* (2015.01); *Y10T 307/74* (2015.04); *Y10T 307/773* (2015.04)

(58) Field of Classification Search
CPC ..... H04L 12/282; H01H 9/02; H02J 13/0013; G01J 5/041; G01J 5/025; Y10T 29/49002; Y10T 307/773
USPC .............. 348/14.01–14.16; 340/5.82
See application file for complete search history.

(56) References Cited

U.S. PATENT DOCUMENTS

| | | | |
|---|---|---|---|
| 7,477,134 B2 | 1/2009 | Langer et al. | |
| 7,745,750 B2 | 6/2010 | Hewson et al. | |
| 8,139,098 B2 | 3/2012 | Carter | |
| 8,144,183 B2 | 3/2012 | Carter | |
| 8,144,184 B2 | 3/2012 | Carter | |
| 8,154,581 B2 | 4/2012 | Carter | |
| 8,164,614 B2 | 4/2012 | Carter | |
| 8,193,919 B2 | 6/2012 | Langer et al. | |
| 8,255,090 B2 | 8/2012 | Frader-Thompson | |
| 9,414,030 B2 | 8/2016 | Carter | |
| 9,432,638 B2 | 8/2016 | Carter | |
| 9,485,478 B2 | 11/2016 | Carter | |
| 9,516,284 B2 | 12/2016 | Carter | |
| 9,635,323 B2 | 4/2017 | Carter | |
| 9,648,290 B2 | 5/2017 | Carter | |
| 9,706,178 B2 | 7/2017 | Carter | |
| 9,866,802 B2 | 1/2018 | Carter | |
| 9,924,141 B2 | 3/2018 | Carter | |
| 2002/0043960 A1 | 4/2002 | Janik | |
| 2003/0014488 A1 | 1/2003 | Dalal et al. | |
| 2004/0267955 A1 | 12/2004 | Konetski et al. | |
| 2005/0253709 A1* | 11/2005 | Baker ................. | G08B 25/009 340/539.26 |
| 2006/0220797 A1* | 10/2006 | Valentino ............... | H01H 9/287 340/286.06 |
| 2008/0024605 A1* | 1/2008 | Osann, Jr. ............. | G06Q 50/06 348/143 |
| 2008/0111684 A1* | 5/2008 | Zinser .................. | G08B 13/196 340/541 |
| 2008/0129498 A1 | 6/2008 | Howarter et al. | |
| 2009/0119142 A1* | 5/2009 | Yenni ..................... | G06Q 10/06 705/7.15 |
| 2009/0321104 A1* | 12/2009 | Etemad-Moghadam ................... | H02G 3/126 174/55 |
| 2011/0012730 A1* | 1/2011 | Finch .................. | E05D 11/0081 340/539.14 |
| 2012/0001755 A1* | 1/2012 | Conrady ................ | H04N 7/186 340/540 |
| 2012/0044050 A1* | 2/2012 | Vig .................... | G07C 9/00158 340/5.82 |
| 2012/0068832 A1 | 3/2012 | Feldstein et al. | |
| 2012/0104197 A1 | 5/2012 | Jensen | |
| 2013/0292481 A1 | 11/2013 | Filson et al. | |
| 2016/0360163 A1 | 12/2016 | Carter | |
| 2016/0366374 A1 | 12/2016 | Carter | |
| 2017/0048489 A1 | 2/2017 | Carter | |
| 2017/0048497 A1 | 2/2017 | Carter | |

FOREIGN PATENT DOCUMENTS

| | | |
|---|---|---|
| CN | 201859997 | 6/2011 |
| CN | 202034605 | 11/2011 |
| CN | 202221821 | 5/2012 |
| CN | 102545113 | 7/2012 |
| JP | 2007174550 | 7/2007 |
| WO | WO 2012/061503 | 5/2012 |
| WO | WO 2012/068503 | 5/2012 |
| WO | WO 2012/068507 | 5/2012 |
| WO | WO 2012/068591 | 5/2012 |

OTHER PUBLICATIONS

Chinese Office Action dated Apr. 29, 2016, for Chinese Patent Application No. 201380060976.1, 5 pages. Chinese Language.
Japanese Office Action dated Jun. 14, 2016, for Japanese Patent Application No. 2015-533233, 3 pages. Japanese Language.
JP Patent Application No. 2015-533233 filed Sep. 20, 2013 Final Office Action dated Feb. 28, 2017, all pages.
EP Patent Application No. 13839713.8 filed Sep. 20, 2013, Office Action dated Oct. 6, 2017, all pages.
Nest Labs, Inc., International Search Report, PCT/US2013/061021, Feb. 2, 2014, 2014, 4 pgs.
Nest Labs, Inc., Written Opinion, PCT/2013/061021, Feb. 20, 2014, 6 pgs.
Google Inc., International Preliminary Report on Patentability, PCT/US2013/061021, Mar. 24, 2015, 7 pgs.
EP Patent Application No. 14763141.0 filed Mar. 14, 2014 Communication pursuant to Rule 164(1) EPC, dated Nov. 4, 2016, all pages.

* cited by examiner

HOME MONITORING AND CONTROL SYSTEM

CROSS REFERENCE TO RELATED APPLICATIONS

This application is a continuation of and claims priority to U.S. patent application Ser. No. 14/430,124, filed Mar. 20, 2015, titled "Wall Switch," which is a 371 application of PCT Application No. PCT/US2013/061021, filed Sep. 20, 2013, which claims the benefit of priority of U.S. Provisional Application No. 61/704,437 filed on Sep. 21, 2012. Each of these patent applications is herein incorporated by reference in its entirety for all purposes.

This application is related to U.S. patent application Ser. No. 15/972,648, titled "Methods and Systems for Home Monitoring and Control," filed May 7, 2018, which is incorporated by reference in its entirety.

TECHNICAL FIELD

This patent specification relates to a wall switch. More particularly, this patent specification relates to a wall switch comprising a docking station and a user-removable wall-switch head unit.

BACKGROUND

Some homes today are equipped with smart home networks to provide automated control of devices, appliances and systems, such as heating, ventilation, and air conditioning ("HVAC") system, lighting systems, alarm systems, home theater and entertainment systems. Smart home networks may include control panels that a person may use to input settings, preferences, and scheduling information that the smart home network uses to provide automated control the various devices, appliances and systems in the home. For example, a person may input a desired temperature and a schedule indicating when the person is away from home. The home automation system uses this information to control the HVAC system to heat or cool the home to the desired temperature when the person is home, and to conserve energy by turning off power-consuming components of the HVAC system when the person is away from the home. Also, for example, a person may input a preferred nighttime lighting scheme for watching television. In response, when the person turns on the television at nighttime, the home automation system automatically adjusts the lighting in the room to the preferred scheme.

SUMMARY

Various embodiments are disclosed herein. In some embodiments, a wall switch controller is provided that comprises a docking station configured to receive a user-removable wall-switch head unit, the docking station configured to be permanently connected to a wall and coupled to high-power voltage wires, and a user-removable wall-switch head unit configured to be user-insertable into said docking station and user-removable therefrom such that the user is not exposed to high-voltage connections when inserting or removing. In some embodiments, the wall switch controller further comprises inputs and outputs and circuitry for switchably controlling household line current power to a household electrical fixture. In some embodiments, the wall switch controller further comprises an occupancy sensor, a temperature sensor, or a processor.

In some embodiments, the wall switch controller further comprises circuitry for leveraging electrical power from the household line current power inputs to power the occupancy sensor, the temperature sensor, or the processor. In some embodiments, the wall switch controller further comprises wireless communication circuitry configured to communicate with a plurality of low-powered devices using a first wireless protocol characterized by relatively low power usage and relatively low data rates and to serve as a communications bridge to a wide area network using a second wireless protocol characterized by relatively higher power usage and relatively higher data rates, and a power storage module for storing power and using the power to maintain wireless communications during a power outage. In some embodiments, the wall switch controller further comprises a housing configured to be compatible for installation in a conventional single-gang or multiple-gang wall box.

In some embodiments, the wall switch controller further comprises a click-and-rotate annular ring input. In some embodiments, the click-and-rotate annular ring input provides a menu-driven interface for controlling operation of the wall switch controller.

In some embodiments, the click-and-rotate annular ring input and the menu-driven interface enable remote control of a wall switch that is separate from and communicatively coupled to the wall switch controller. In some embodiments, the click-and-rotate annular ring input enables the wall switch controller to function as a dimming light switch.

In some embodiments, a method is provided that comprises receiving, at a docking station configured to be permanently connected to a wall and coupled to high-power voltage wires, a user-removable wall-switch head unit that is configured to be user-insertable into the docking station and user-removable therefrom such that a user is not exposed to the high-voltage wires when inserting or removing; leveraging electrical power from the high-power voltage wires to power the user-removable wall-switch head unit; and responsive to user input, controlling household line current power to a household electrical fixture. In some embodiments, the method further comprises providing, by the user-removable wall-switch head unit, a click-and-rotate annular ring input. In some embodiments, the click-and-rotate annular ring input received the user input that resulted in controlling the household line current power to the household electrical fixture.

In some embodiments, the click-and-rotate annular ring input provides a menu-driven interface. In some embodiments, the click-and-rotate annular ring input enables the wall switch to function as a dimming light switch. In some embodiments, the user-removable wall-switch head unit includes wireless communication circuitry. In some embodiments, the user-removable wall-switch head unit is configured to communicate with a plurality of low-powered devices using a first wireless protocol characterized by relatively low power usage and relatively low data rates. In some embodiments, the user-removable wall-switch head unit is configured to serve as a communications bridge to a wide area network using a second wireless protocol characterized by relatively higher power usage and relatively higher data rates. In some embodiments, the user-removable wall-switch head unit is configured to remotely control operation of a second wall switch that is separate from and not physically connected to the user-removable wall-switch head unit. In some embodiments, the user-removable wall-switch head unit is configured to store power and use the power to maintain wireless communications during a power outage.

Various techniques for providing smart home objectives are disclosed herein. Embodiments described herein are representative examples of devices, methods, systems, services, and/or computer program products that can be used in conjunction with an extensible devices and services platform that, while being particularly applicable and advantageous in the smart home context, is generally applicable to any type of enclosure or group of enclosures (e.g., offices, factories, retail stores), vessels (e.g., automobiles, aircraft), or other resource-consuming physical systems that will be occupied by humans or with which humans will physically or logically interact. Thus, although particular examples are set forth in the context of a smart home, it is to be appreciated that the scope of applicability of the described extensible devices and services platform is not so limited.

In some embodiments, a system for accomplishing an objective in a smart-home environment, the system comprising: one or more low-powered nodes located in the smart-home environment; and one or more smart nodes located in the smart-home environment; the low-powered and smart nodes communicatively interconnected for the purpose of accomplishing the objective in the smart-home environment. At least one of the low-powered and smart nodes is configured to: monitor a condition of the smart-home environment; and transmit to at least one of the other low-powered and smart nodes a message having information related to the condition of the smart-home environment.

In one example, responsive to receiving a message having information related to a condition of the smart-home environment, at least one of the smart nodes is configured to: determine an objective to be accomplished in the smart-home environment, the objective being appropriate in light of the condition; determine a function to be performed in the smart-home environment for the purpose of accomplishing the objective; and transmit to the other low-powered and smart nodes of the smart-home environment instructions to perform the function in the smart-home environment for the purpose of accomplishing the objective. In another example, responsive to receiving a message having information related to a condition of the smart-home environment, at least one of the smart nodes is configured to transmit to a server a message having information related to a condition of the smart-home environment. According to this example, responsive to receiving a message having information related to the condition of the smart-home environment, the server is configured to: determine an objective to be accomplished in the smart-home environment, the objective being appropriate in light of the condition; determine a function to be performed in the smart-home environment for the purpose of accomplishing the objective; and transmit to at least one of the smart nodes of the smart-home environment instructions to perform the function in the smart-home environment for the purpose of accomplishing the objective.

According to embodiments, the low-powered nodes are capable of communicating using a first wireless protocol characterized by relatively low power usage and relatively low data rates, and wherein the smart nodes are capable of communicating using the first wireless protocol and a second wireless protocol characterized by relatively higher power usage and relatively higher data rates. According to embodiments, when transmitting to a server a message having information related to a condition of the smart-home environment, at least one of the smart nodes serves as a communication bridge to a wide area network using the second wireless protocol characterized by relatively higher power usage and relatively higher data rates.

According to embodiments, the smart nodes can smart devices. The smart devices are, for example, one or more of a hazard detector unit, a doorbell, a thermostat, a wall switch, and a wall plug. In other embodiments, the low-powered nodes are smart devices. In some examples, the smart devices are identical and capable of performing as the low-powered node and the smart node. Example conditions to be monitored include one or more of a temperature, an amount of light, a sound, a movement, a vibration, a smell, a toxin, and an amount of heat. Example functions and corresponding objectives include one or more of triggering an alarm to secure the smart-home environment, adjusting a thermostat setting to make the smart-home environment comfortable, and turning on or off a light to secure the smart-home environment or for use by occupants of the smart-home environment.

According to another embodiment, a method is provided, comprising: monitoring, by one or more communicatively interconnected low-powered and smart nodes, a condition of a smart-home environment; transmitting, by at least one of the low-powered and smart nodes, a message having information related to the condition of the smart-home environment; receiving, by at least one of the smart nodes, a message having information related to the condition in the smart-home environment; determining, by at least one of the smart nodes based at least in part on the information related to the condition, a function to be performed in the smart-home environment; transmitting, by at least one of the smart nodes, a message that causes at least one of the low-powered and smart nodes to perform the function in the smart-home environment. In some embodiments, transmitting, by at least one of the low-powered and smart nodes, a message having information related to the condition of the smart-home environment involves "repeating" the message to the other low-powered and smart nodes in the smart-home environment.

According to another embodiment, a home automation system is provided, comprising: a home security system including one or more sensor nodes capable of detecting motion within a home; and a service robot system including at least one service robot that autonomously moves within the home to perform one or more functions; wherein the home security system and the service robot system are mutually configured such that there will not be a motion alarm set off by the robot when the robot moves within a range of the one or more sensor nodes. According to embodiments the home automation system further comprises a computing device provided in operative communication with the home security system and the service robot system, the computing device configured to: receive in-home location coordinates from the robot; and distinguish between activity associated with the robot and unexpected intrusion activity by using the in-home location coordinates to filter signals from the one more sensor nodes. In some examples, the computing device is an on-site computing device. In other examples, the computing device is a remote server. According to embodiments, the robot outputs a signal when moving to alert the home security system to its presence so that there will not be a motion alarm set off for as long as the signal is detected by the one or more sensor nodes.

In some embodiments of the home automation system, the signal is authenticated and encrypted such that the signal cannot be learned and replicated by a potential burglar. In some examples, signal authentication and encryption is accomplished by a permission request-response scheme, wherein the service robot system requests permission from home security system when the service robot system is ready to deploy the robot to perform the one or more function. The signal can be, for example, one or more of an optical notifying signal, an audible notifying signal, an infrared notifying signal, an infrasonic notifying signal, and a wirelessly transmitted data notification signal. According to embodiments, the service robot system does not deploy the robot until receiving a "yes" message from home security system. Example functions performed by the robot include, but are not limited to, one or more of floor sweeping, floor washing, playing music for an occupant, serving as a localized thermostat for an occupant, serving as a localized air monitor/purifier for an occupant, serving as a localized baby monitor, and serving as a localized hazard detector for an occupant.

According to another embodiment, a wall switch controller is provided, comprising: a docking station configured to receive a user-removable wall-switch head unit, the docking station configured to be permanently connected to a wall and coupled to high-power voltage wires; and a user-removable wall-switch head unit configured to be user-insertable into said docking station and user-removable therefrom such that the user is not exposed to high-voltage connections when inserting or removing. In some embodiments, the wall switch controller further comprises inputs and outputs and circuitry for switchably controlling household line current power to at least one household electrical fixture; one or more of an occupancy sensor, a temperature sensor, and a processor; circuitry for leveraging electrical power from the household line current power inputs to power one or more of the occupancy sensor, the temperature sensor, and the processor; wireless communication circuitry configured to communicate with a plurality of low-powered devices using a first wireless protocol characterized by relatively low power usage and relatively lower data rates and to serve as a communications bridge to a wide area network using a second wireless protocol characterized by relatively higher power usage and relatively higher data rates; a power storage module for storing power and using the power to maintain wireless communications during a power outage; a housing configured to be compatible for installation in a conventional single-gang or multiple-gang wall box.

According to another embodiment, a method is provided for providing an alarm clock in a smart-home environment, comprising: obtaining, at a server, a wake time for an occupant of the smart-home environment; and instructing, by the server, one or more smart devices in the smart-home environment to output an audible alarm when the wake time occurs. According to embodiments, obtaining a wake time comprises: obtaining over a period, from one or more motion-sensing smart devices located in the smart-home environment, data related to movement of the occupant in response to an alarm; and inferring, by the server, a wake time based at least in part on the data related to movement of the occupant in response to an alarm over the period. According to embodiments, the method further comprises: tracking, by the one or more motion-detecting smart devices, movement of the occupant between one or more locations within the smart-home environment; detecting when the occupant stops moving for a period; inferring that the occupant has fallen asleep at a location within the smart-home environment; inferring where and when the occupant prefers to sleep.

According to embodiments, instructing one or more smart devices in the smart-home environment to output an audible alarm when the wake time occurs, comprises: instructing only the one of the one or more smart devices that is closest to the occupant to output the audible alarm. In some examples, tracking a location of the occupant within the smart-home environment, comprises: generating a unique signature for the occupant based at least in part of data obtained from the one or more smart devices; and using the unique signature to distinguish the occupant from other occupants of the smart-home environment. The unique signature of the occupant, according to some embodiments, is based on one or more of a walking gate, patterns of movement, voice, height, and size. The data that is obtained from the one or more smart devices and used to generate the unique signature is, for example, obtained from at least one of an ultrasonic sensor and a passive IR sensor included in the one or more motion-detecting smart devices.

According to embodiments, the method of providing an alarm clock further comprising: transmitting, to a thermostat, instructions to heat or cool the smart-home environment to a desired "sleeping" temperature setting when the occupant is determined to be sleeping; and transmitting, to a thermostat, instructions to heat or cool the smart-home environment to a desired "awake" temperature setting when the occupant is not determined to be sleeping. In some examples, the desired "sleeping" and "awake" temperature settings can be learned over time, such as be observing which temperature the occupant sets the thermostat to before going to sleep and which temperature the occupant sets the thermostat to upon waking up. According to embodiments, the method further comprises transmitting, to a thermostat, instructions to pre-heat or pre-cool the smart-home environment to a desired "awake" temperature setting in anticipation of the occupant waking up.

According to another embodiment, a method is provide, the method comprises: obtaining, at a server from one or more smart devices located in one or more smart-home environments, home data collected from the smart-home environments by one or more sensors of the smart devices; and exposing, by the server, one or more application program interfaces for access by one or more service-provider entities to obtain the home data for the purpose of optimizing one or more home services provided by the one or more service-provider entities to the one or more smart-home environments. The data, for example, includes at least one of smart device usage patterns and occupant presence patterns. In some embodiments, the server derives aggregate patterns from the home data. According to embodiments, the server provides neighborhood-level probabilities regarding whether occupants may be currently present in the smart-home environments. According to embodiments, the one or more home services being optimized are delivery services whose effectiveness is improved when the occupants are at home. According to embodiments, the application program interfaces anonymize the home data such that any one of the smart-home environments is not identifiable. According to embodiments, the one or more home services being optimized are not functionally related to the home data being collected by the one or more smart sensors.

According to another embodiment, a home monitoring and control system is provided. The system comprises: a plurality of hazard detectors with wireless capability and occupancy detectors and audio speakers; and a doorbell having a processor and wireless capability; wherein a doorbell-ringing event triggers the processor to cause the doorbell to wirelessly communicate with one or more of the hazard detectors to cause the audio speakers to alert occupants of a visitor at the door. In some embodiments, each hazard detector can be configured with a do-not-disturb setting such that it will remain silent under one or more pre-determined conditions. According to embodiments, the pre-determined conditions include one or more of an occupant determined to be sleeping proximate to the hazard detector, room location of hazard detector is unoccupied, hazard detector is located in an occupied bedroom; and hazard detector is located in a kid's bedroom.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Embodiments of the present invention generally relate to a plurality of devices, including intelligent, multi-sensing, network-connected devices, that communicate with each other and/or with a central server or a cloud-computing system to provide any of a variety of useful smart home objectives.

Figure 1:
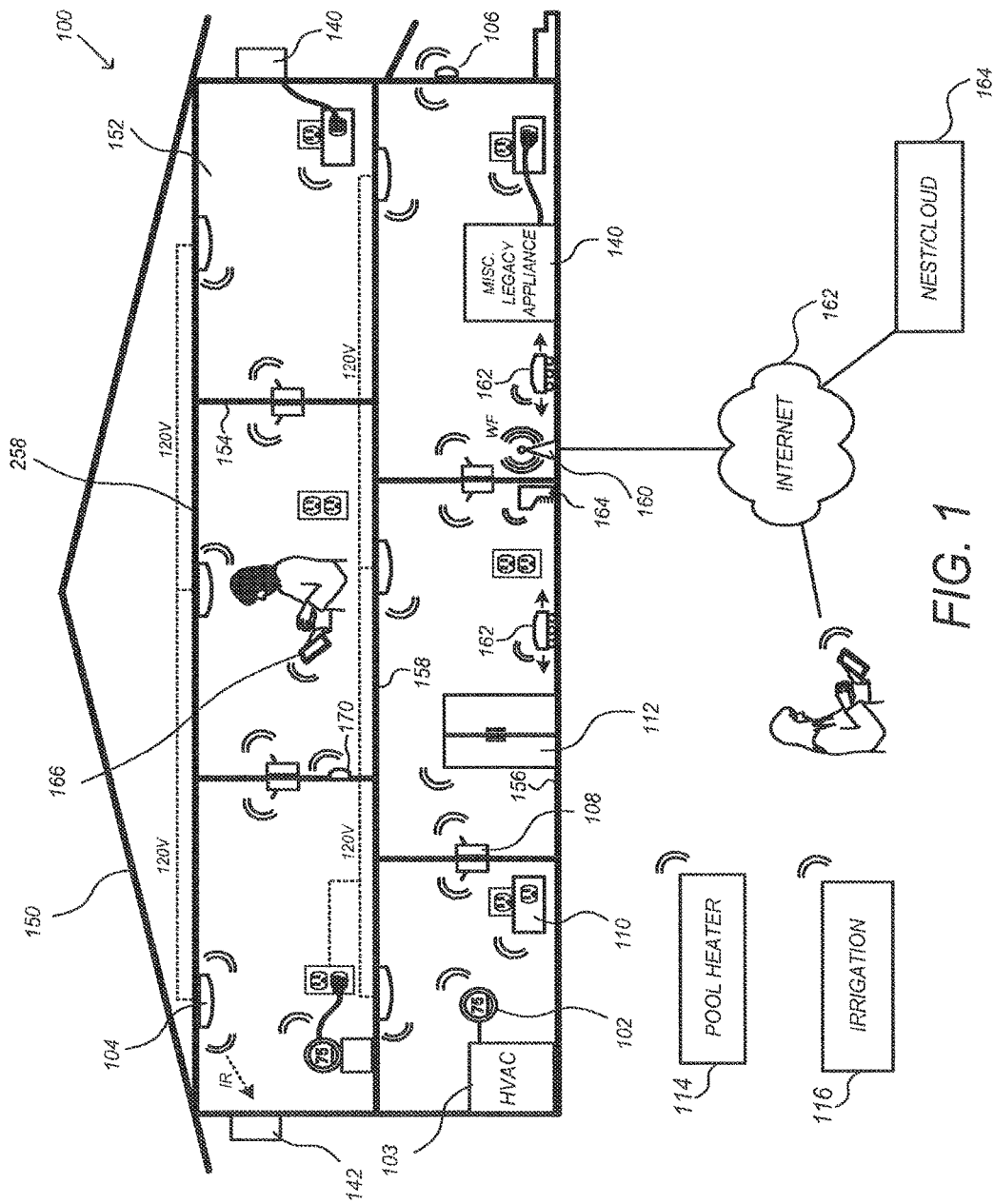
FIG. 1 an example of a smart-home environment within which one or more of the devices, methods, systems, services, and/or computer program products described further herein will be applicable, according to embodiments.

Various aspects and possible implementations of providing smart-home objectives are disclosed herein. Turning to the figures, FIG. 1 illustrates an example of a smart-home environment 100 within which one or more of the devices, methods, systems, services, and/or computer program products described further herein can be applicable. The depicted smart-home environment 100 includes a structure 150, which can include, e.g., a house, office building, garage, or mobile home. It should be appreciated that the smart-home environment 100 includes areas outside the home, such as curtilage, the yard, and other nearby land. It will be appreciated that devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes a plurality of devices, including intelligent, multi-sensing, network-connected devices, that can integrate seamlessly with each other and/or with a central server or a cloud-computing system to provide any of a variety of useful smart-home objectives. The smart-home environment 100 may include one or more intelligent, multi-sensing, network-connected thermostats 102 (herein after referred to as "smart thermostats 102"), one or more intelligent, network-connected, multi-sensing hazard detection units 104 (herein after referred to as "smart hazard detectors 104"), and one or more intelligent, multi-sensing, network-connected entryway interface devices 106 (herein after referred to as "smart doorbells 104"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may detect a person's approach to or departure from a location (e.g., an outer door), control doorbell functionality, announce a person's approach or departure via audio or visual means, or control settings on a security system (e.g., to activate or deactivate the security system when occupant go and come).

In some embodiments, the smart-home environment 100 of FIG. 1 further includes one or more intelligent, multi-sensing, network-connected wall switches 108 (herein after referred to as "smart wall switches 108"), along with one or more intelligent, multi-sensing, network-connected wall plug interfaces 110 (herein after referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

Still further, in some embodiments, the smart-home environment 100 of FIG. 1 includes a plurality of intelligent, multi-sensing, network-connected appliances 112 (herein after referred to as "smart appliances 112"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 112 are made compatible with the smart-home environment by cooperating with the respective manufacturers of the appliances. For example, the appliances can be space heaters, window AC unites, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated any wired or wireless communication protocols known by those having ordinary skill in the art. The smart home also can include a variety of non-communicating legacy appliances 140, such as old conventional washer/dryers, refrigerators, and the like which can be controlled, albeit coarsely (ON/OFF), by virtue of the smart wall plugs 110. The smart-home environment 100 can further include a variety of partially communicating legacy appliances 142, such as infrared ("IR") controlled wall air conditioners or other IR-controlled devices, which can be controlled by IR signals provided by the smart hazard detectors 104 or the smart wall switches 108.

According to embodiments, the smart thermostats 102, the smart hazard detectors 104, the smart doorbells 106, the smart wall switches 108, the smart wall plugs 110, and other devices of the smart-home environment 100 are modular and can be incorporated into older and new houses. For example, the devices are designed around a modular platform consisting of two basic components: a head unit and a backplate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 100 may also include communication with devices outside of the physical home but within a proximate geographical range of the home. For example, the smart-home environment 100 may include a pool heater monitor 114 that communicates a current pool temperature to other devices within the smart-home environment 100 or receives commands for controlling the pool temperature. Similarly, the smart-home environment 100 may include an irrigation monitor 116 that communicates information regarding irrigation systems within the smart-home environment 100 and/or receives control information for controlling such irrigation systems. According to embodiments, an algorithm is provided for considering the geographic location of the smart-home environment 100, such as based on the zip code or geographic coordinates of the home. The geographic information is then used to obtain data helpful for determining optimal times for watering, such data may include sun location information, temperature, due point, soil type of the land on which the home is located, etc.

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone) 166. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

As discussed, users can control the smart thermostat and other smart devices in the smart-home environment 100 using a network-connected computer or portable electronic device 166. In some examples, some or all of the occupants (e.g., individuals who live in the home) can register their device 166 with the smart-home environment 100. Such registration can be made at a central server to authenticate the occupant and/or the device as being associated with the home, and to give permission to the occupant to use the device to control the smart devices in the home. An occupant can use their registered device 166 to remotely control the smart devices of the home, such as when the occupant is at work or on vacation. The occupant may also use their registered device to control the smart devices when the occupant is actually located inside the home, such as when the occupant sitting on a couch inside the home. It should be appreciated that instead of or in addition to registering devices 166, the smart-home environment 100 makes inferences about which individuals live in the home and are therefore occupants and which devices 166 are associated with those individuals. As such, the smart-home environment "learns" who is an occupant and permits the devices 166 associated with those individuals to control the smart devices of the home.

In some instances, guests desire to control the smart devices. For example, the smart-home environment may receive communication from an unregistered mobile device of an individual inside of the home, where said individual is not recognized as an occupant of the home. Further, for example, smart-home environment may receive communication from a mobile device of an individual who is known to be or who is registered as a guest.

According to embodiments, a guest-layer of controls can be provided to guests of the smart-home environment 100. The guest-layer of controls gives guests access to basic controls (e.g., a judicially selected subset of features of the smart devices), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls won't permit the guest to adjust the heat-pump lockout temperature.

A use case example of this is when a guest in a smart home, the guest could walk up to the thermostat and turn the dial manually, but the guest may not want to walk the house "hunting" the thermostat, especially at night while the home is dark and others are sleeping. Further, the guest may not want to go through the hassle of downloading the necessary application to their device for remotely controlling the thermostat. In fact, the guest may not have to the home owner's login credentials, etc., and therefore cannot remotely control the thermostat via such an application. Accordingly, according to embodiments of the invention, the guest can open a mobile browser on their mobile device, type a keyword, such as "NEST" into the URL field and tap "Go" or "Search", etc. In response the device presents with guest with a user interface, such as Thermozilla UI, which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device, such as the smart thermostat, the home owner is asked if they want to enable a Local Web App (LWA) on the smart device. Business owners will likely say no; home owners will likely say yes. When the LWA option is selected, the smart device broadcasts to the LAN that the above referenced keyword, such as "NEST", is now a host alias for its local web server. Thus, no matter whose home a guest goes to, that same keyword (e.g., "NEST" is always the URL you use to access the LWA, provided the smart device is purchased from the same manufacturer. Further, according to embodiments, if there is more than one smart device on the LAN, the second and subsequent smart devices do not offer to set up another LWA. Instead, they register themselves as target candidates with the master LWA. And in this case the LWA user would be asked which smart device they want to change the temperature on before getting the simplified user interface, such as Thermozilla UI, for the particular smart device they choose.

According to embodiments, a guest layer of controls may also be provided to users by means other than a device 166. For example, the smart device, such as the smart thermostat, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques descripted in other sections of this application. In operation, when a person who does not live in the home or is otherwise not registered with or whose fingerprint or signature is not recognized by the smart home "walks up" to a smart device, the smart devices provides the guest with the guest layer of controls, rather than full controls.

As described below, the smart thermostat and other smart devices "learn" by observing occupant behavior. For example, the smart thermostat learns occupants preferred temperature set-points for mornings and evenings, and it learns when the occupants are asleep or awake, as well as when the occupants are typically away or at home, for example. According to embodiments, when a guest controls the smart devices, such as the smart thermostat, the smart devices do not "learn" from the guest. This prevents the guest's adjustments and controls from affecting the learned preferences of the occupants.

According to some embodiments, a smart television remote control is provided. The smart remote control recognizes occupants by thumbprint, visual identification, RFID, etc., and it recognizes users as guests or as someone belonging to a particular class having limited control and access (e.g., child). Upon recognizing the user as a guest or someone belonging to a limited class, the smart remote control only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices in the house. For example, sinks, bathtubs, and showers can be controlled by smart spigots that recognize users as guests or as children and therefore prevents water from exceeding a designated temperature that is considered safe.

In some embodiments, in addition to containing processing and sensing capabilities, each of the devices 102, 104, 106, 108, 110, 112, 114, and 116 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.)

According to embodiments, all or some of the smart devices can serve as wireless or wired repeaters. For example, a first one of the smart devices can communicate with a second one of the smart device via a wireless router 160. The smart devices can further communicate with each other via a connection to a network, such as the Internet 162. Through the Internet 162, the smart devices can communicate with a central server or a cloud-computing system 164. The central server or cloud-computing system 164 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

According to embodiments, the smart devices combine to create a network, such as a mesh network, of spokesman and low-power nodes in the smart-home environment 100, where some of the smart devices are "spokesman" nodes and others are "low-powered" nodes. Spokesman nodes are sometimes referred to herein as "smart" nodes. It should be appreciated that non-smart devices may perform as lower-powered nodes. The spokesman and low-powered nodes are communicatively interconnected and operate to accomplish a common objective or to achieve a common goal in the smart-home environment. In some embodiments, some or all of the spokesman and low-powered nodes perform one or more functions in a coordinate manner to accomplish the common objection. Example functions and objectives include, but are not limited to, triggering an alarm for the objective securing the home, adjusting a thermostat setting for the objective of making the home comfortable, and turning on and of lights for the objective of securing the home or for use by occupants. Other example objective and functions are provided throughout this document. Some of the smart devices in the smart-home environment 100 are battery powered, while others have a regular and reliable power source, such as by connecting to wiring (e.g., to 120V line voltage wires) behind the walls 154 of the smart-home environment. The smart devices that have a regular and reliable power source are referred to as "spokesman" or "smart" nodes. These nodes are equipped with the capability of using any wireless protocol or manner to facilitate bidirectional communication with any of a variety of other devices in the smart-home environment 100 as well as with the central server or cloud-computing system 164. On the other hand, the devices that are battery powered are referred to as "low-power" nodes. These nodes tend to be smaller than spokesman nodes and can only communicate using wireless protocol that requires very little power, such as Zigbee, 6LoWPAN, etc. Further, some, but not all, low-power nodes are incapable of bidirectional communication. These low-power nodes send messages, but they are unable to "listen". Thus, other devices in the smart-home environment 100, such as the spokesman nodes, cannot send information to these low-power nodes.

As described, the smart devices serve as low-power and spokesman nodes to create a mesh network in the smart-home environment 100. Individual low-power nodes in the smart-home environment regularly send out messages regarding what they are sensing, and the other lower-powered nodes in the smart-home environment—in addition to sending out their own messages—repeat the messages, thereby causing the messages to travel from node to node (i.e., device to device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the lower-powered nodes using low-power communication protocols are able send messages across the entire smart-home environment 100 as well as over the Internet 162 to the central server or cloud-computing system 164. According to embodiments, the mesh network enables the central server or cloud-computing system 164 regularly receive data from all of the smart devices in the home, make inferences based on the data, and send commands back to individual one of the smart devices to accomplish some of the smart-home objectives descried herein.

As described, the spokesman nodes and some of the lower-powered nodes are capable of "listening". Accordingly, users, other devices, and the central server or cloud-computing system 164 can communicate controls to the lower-powered nodes. For example, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164. In some embodiments, the low-powered nodes and the spokesman nodes are the same type of device (e.g., hazard detector, thermostat, wall plug, etc.). In some embodiments, the low-powered and spokesman nodes are identical. For example, in some embodiments, all of the low-powered and spokesman nodes have the same stock-keeping unit (SKU) and/or are capable of performing any role, such as performing the role of low-powered and/or spokesman node.

An example of a low-power node is a smart nightlight 170. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and when its occupancy sensor detects that someone is in the room. In other embodiments, the smart nightlight 170 is simply configured to activate the light source when its ambient light sensor detects that the room is dark. Further, according to embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 100 as well as over the Internet 162 to the central server or cloud-computing system 164.

Other examples of lower-powered nodes include battery-operated versions of the smart hazard detectors 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 can send messages that correspond to each of the respective sensors to the other devices and the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore can include more power-consuming components, such as one or more communication chips capable of bidirectional communication in any variety of protocols.

In some embodiments, these low-powered and spokesman nodes (e.g., devices 102, 104, 106, 108, 110, 112, and 170) can function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, etc. message from one or more of the low-powered and spokesman nodes in the mesh network. For example, upon receiving a message from a smart nightlight 170 indicating the presence of a person, the central server or cloud-computing system 164 or some other device could trigger an alarm, provided the alarm is arm at the time of detection. Thus, the alarm system could be enhanced by various low-powered and spokesman nodes located throughout the smart-home environment 100. In this example, a user could enhance the security of the smart-home environment 100 by buying and installing extra smart nightlights 170.

In some embodiments, the mesh network can be used to automatically turn on and off lights as a person transitions from room to room. For example, the low-powered and spokesman nodes (e.g., devices 102, 104, 106, 108, 110, 112, and 170) detect the person's movement through the smart-home environment and communicate corresponding messages through the mesh network. Using the messages that indicate which rooms are occupied, the central server or cloud-computing system 164 or some other device activates and deactivates the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device activates and deactivates the smart wall plugs 110 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 100. For example, for each room in the house, the user provides a map of the best exit route. It should be appreciated that instead of a user providing this information, the central server or cloud-computing system 164 or some other device could the automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting.

Further included and illustrated in the exemplary smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc.) in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using onboard sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, Zigbee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii)) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot will remain relatively constant from event to event, and in view of the fact that the away-service events will likely either (a) themselves be triggered by some sort of nonoccupancy condition as measured by the away-service robots themselves, or (b) will occur at regular times of day, there will be patterns in the collected data by which the events themselves will become apparent and for which the environmental signatures can be readily learned. Generally speaking, for this automatic-learning embodiment in which the environmental signatures of the away-service robots are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious, whereas false home security alarms may have more serious consequences.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device in the smart-home environment 100 that happens to be closest to the occupant when the occupant falls asleep will be the devices that transmits messages regarding when the occupant stopped moving, from which the central server or cloud-computing system 164 will make inferences about where and when the occupant prefers to sleep. This closest smart device will as be the device that sounds the alarm to wake the occupant. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

In some embodiments, the wake times associated with the "smart alarm clock" are used to by the smart thermostat 102 to control the HVAC in an efficient manner so as to pre-heat or cool the house to the occupant's desired "sleeping" and "awake" temperature settings. The preferred settings can be learned over time, such as be observing which temperature the occupant sets the thermostat to before going to sleep and which temperature the occupant sets the thermostat to upon waking up.

In some embodiments, a device is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 102 so as to pre-heat or cool the home to the occupant's desired setting before the occupant wakes up. Further, these predictions can be used to set the "smart alarm clock" for the occupant, to turn on lights, etc.

According to embodiments, technologies including the sensors of the smart devices location through the smart-home environment in combination with rules-based inference engines or artificial intelligence provided at the central server or cloud-computing system 164 are used to detector or monitor the progress of Alzheimer's Disease. For example, the unique signatures of the occupants are used to track the individual occupants' movement throughout the smart-home environment 100. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 164 analyze the person's migration data collected by the mesh network of the smart-home environment to identify such patterns.

Figure 2:
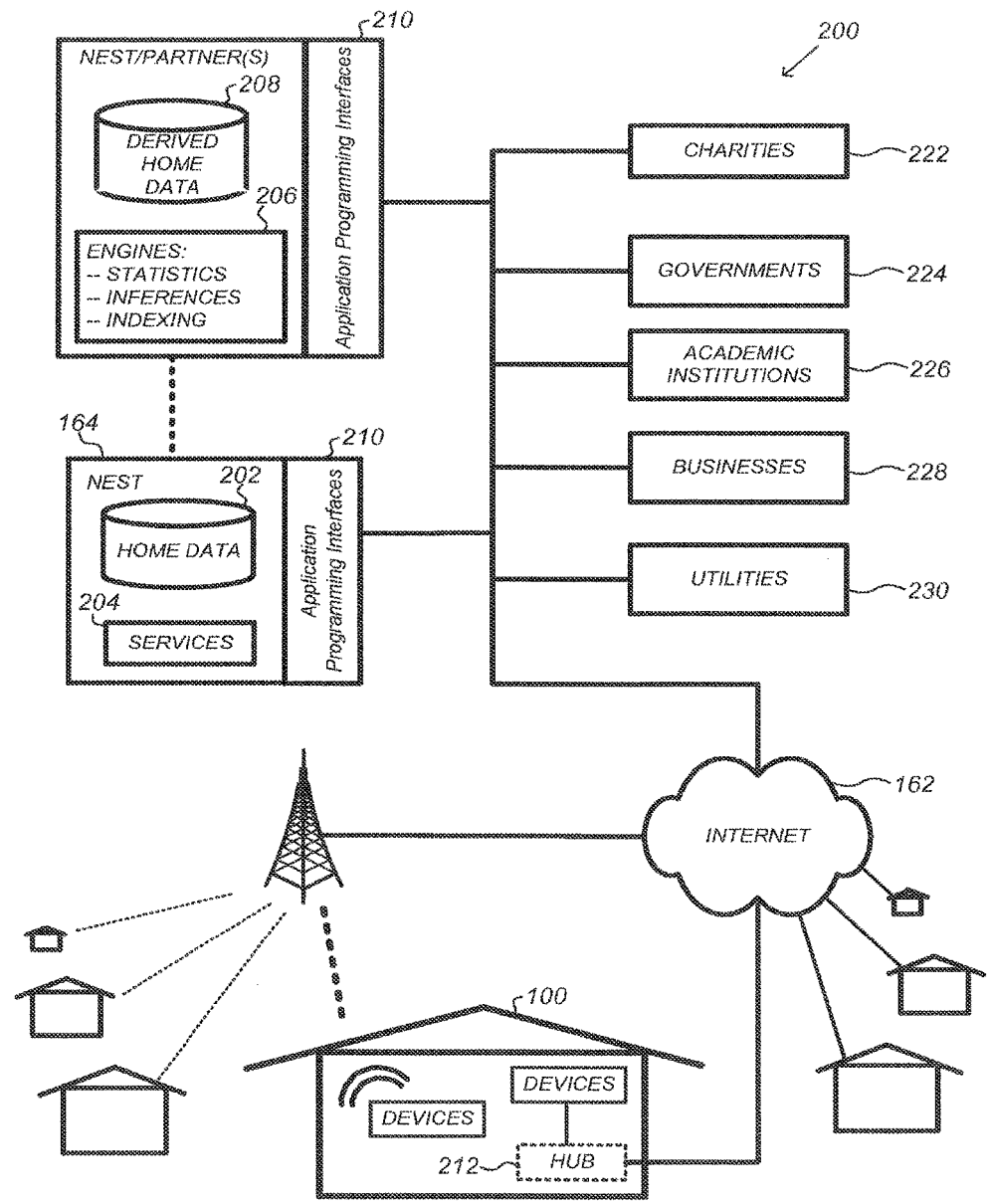
FIG. 2 illustrates a network-level view of an extensible devices and services platform with which the smart-home environment of FIG. 1 can be integrated, according to embodiments.

FIG. 2 illustrates a network-level view of an extensible devices and services platform 200 with which a plurality of smart-home environments, such as the smart-home environment 100 of FIG. 1, can be integrated. The extensible devices and services platform 200 includes remote servers or cloud computing architectures 164. Each of the intelligent, network-connected devices 102, 104, 106, 108, 110, 112, 114, and 116 from FIG. 1 (identified simply as "smart devices" in FIGS. 2-3 herein) can communicate with the remote servers or cloud computing architectures 164. For example, a connection to the Internet 162 can be established either directly (for example, using 3G/4G connectivity to a wireless carrier), though a hubbed network 212 (which can be scheme ranging from a simple wireless router, for example, up to and including an intelligent, dedicated whole-home control node), or through any combination thereof.

Although in some examples provided herein, the devices and services platform 200 communicates with and collects data from the smart devices of smart-home environment 100 of FIG. 1, it should be appreciated that the devices and services platform 200 communicates with and collects data from a plurality of smart-home environments across the world. For example, the central server or cloud-computing system 164 can collect home data 202 from the devices of one or more smart-home environments, where the devices can routinely transmit home data or can transmit home data in specific instances (e.g., when a device queries the home data 202). Thus, the devices and services platform 200 routinely collects data from homes across the world. As described, the collected home data 202 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204. The services 204 can include, e.g., software updates, customer support, sensor data collection/logging, remote access, remote or distributed control, or use suggestions (e.g., based on collected home data 202 to improve performance, reduce utility cost, etc.). Data associated with the services 204 can be stored at the central server or cloud-computing system 164 and the central server or the cloud-computing system 164 can retrieve and transmit the data at an appropriate time (e.g., at regular intervals, upon receiving request from a user, etc.).

As illustrated in FIG. 2, embodiments of the extensible devices and services platform 200 include a processing engine 206, which can be concentrated at a single server or distributed among several different computing entities without limitation. The processing engine 206 can include engines configured to receive data from devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about device usage across a population of devices and send the statistics to device users, service providers or other entities (e.g., that have requested or may have provided monetary compensation for the statistics).

According to some embodiments, the home data 202, the derived home data 208, and/or another data can be used to create "automated neighborhood safety networks." For example, in the event the central server or cloud-computing architecture 164 receives data indicating that a particular home has been broken into, is experiencing a fire, or some other type of emergency event, an alarm is sent to other smart homes in the "neighborhood." In some instances, the central server or cloud-computing architecture 164 automatically identifies smart homes within a radius of the home experiencing the emergency and sends an alarm to the identified homes. In such instances, the other homes in the "neighborhood" do not have to sign up for or register to be a part of a safety network, but instead are notified of emergency based on their proximity to the location of the emergency. This creates robust and evolving neighborhood security watch networks, such that if one person's home is getting broken into, an alarm can be sent to nearby homes, such as by audio announcements via the smart devices located in those homes. It should be appreciated that this can be an opt-in service and that, in addition to or instead of the central server or cloud-computing architecture 164 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g., sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirmation that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those home to help facilitate early detection and prevention.

In some embodiments, to encourage innovation and research and to increase products and services available to users, the devices and services platform 200 exposes a range of application programming interfaces (APIs) 210 to third parties, such as charities 222, governmental entities 224

(e.g., the Food and Drug Administration or the Environmental Protection Agency), academic institutions 226 (e.g., university researchers), businesses 228 (e.g., providing device warranties or service to related equipment, targeting advertisements based on home data), utility companies 230, and another other third parties. The APIs 210 are coupled to and permit third-party systems to communicate with the central server or the cloud-computing system 164, including the services 204, the processing engine 206, the home data 202, and the derived home data 208. For example, the APIs 210 allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps, that integrate with the central server or the cloud-computing system 164 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 202 and the derived home data 208, such inferences may include when are occupants home, when are they sleeping, when are they cooking, when are they in the den watching television, when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of time consumers have to pick up their packages from the shipping company.

Figure 3:
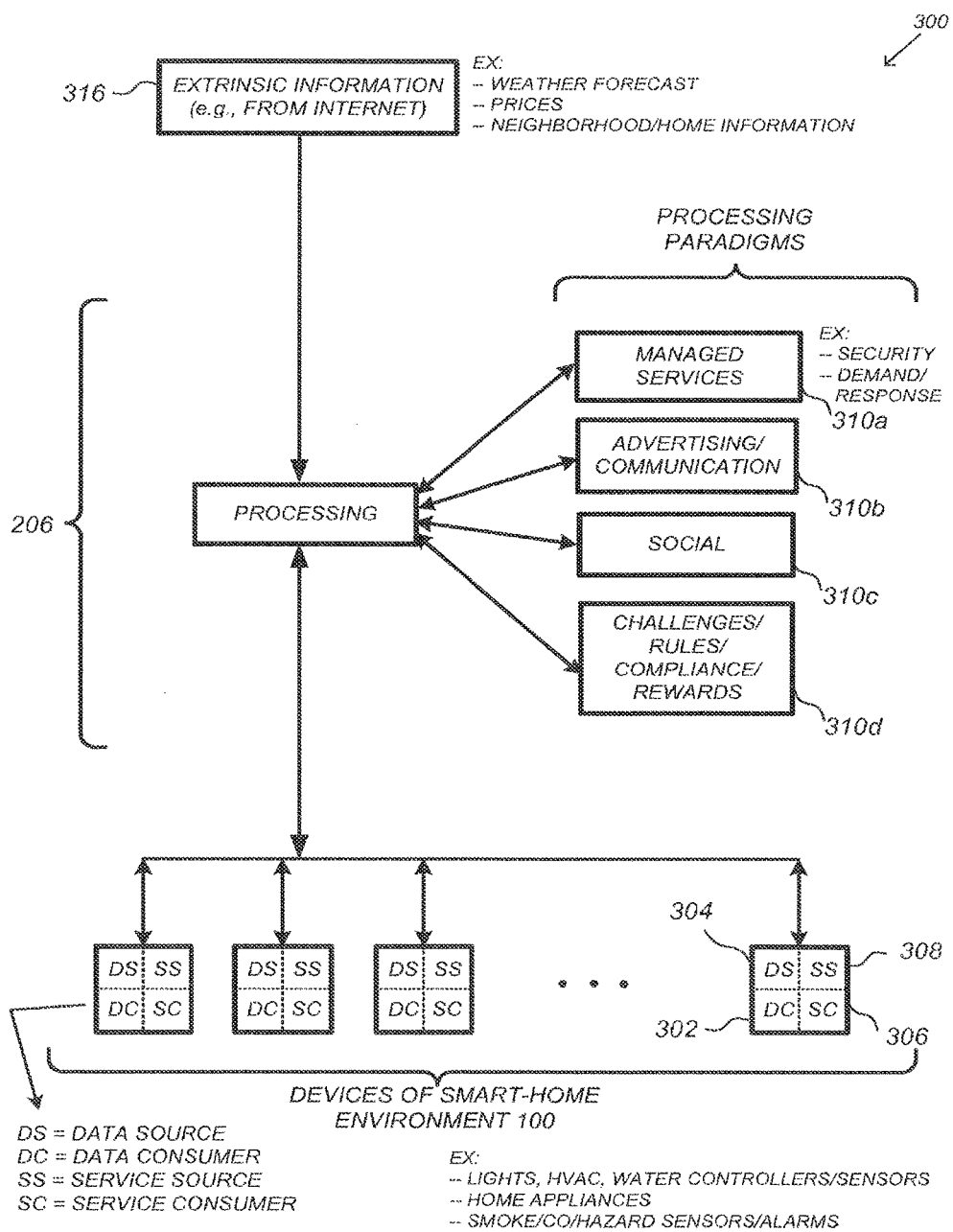
FIG. 3 illustrates an abstracted functional view of the extensible devices and services platform of FIG. 2, with reference to a processing engine as well as devices of the smart-home environment, according to embodiments.

FIG. 3 illustrates an abstracted functional view of the extensible devices and services platform 200 of FIG. 2, with particular reference to the processing engine 206 as well as devices, such as those of the smart-home environment 100 of FIG. 1. Even though devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Yet another example, a user may share HVAC settings that result in low power bills and other users may download the HVAC settings to their smart thermostat 102 to reduce their power bills.

The processing engine 206 can include a challenges/rules/compliance/rewards paradigm 310d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participates turning down their thermostat by one degree for one week. Those that successfully complete the challenge are rewarded, such as by coupons, virtual currency, status, etc. Regarding compliance, an example involves a rental-property owner making a rule that no renters are permitted to access certain owner's rooms. The devices in the room having occupancy sensors could send updates to the owner when the room is accessed.

The processing engine 206 can integrate or otherwise utilize extrinsic information 316 from extrinsic sources to improve the functioning of one or more processing paradigms. Extrinsic information 316 can be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 4A:
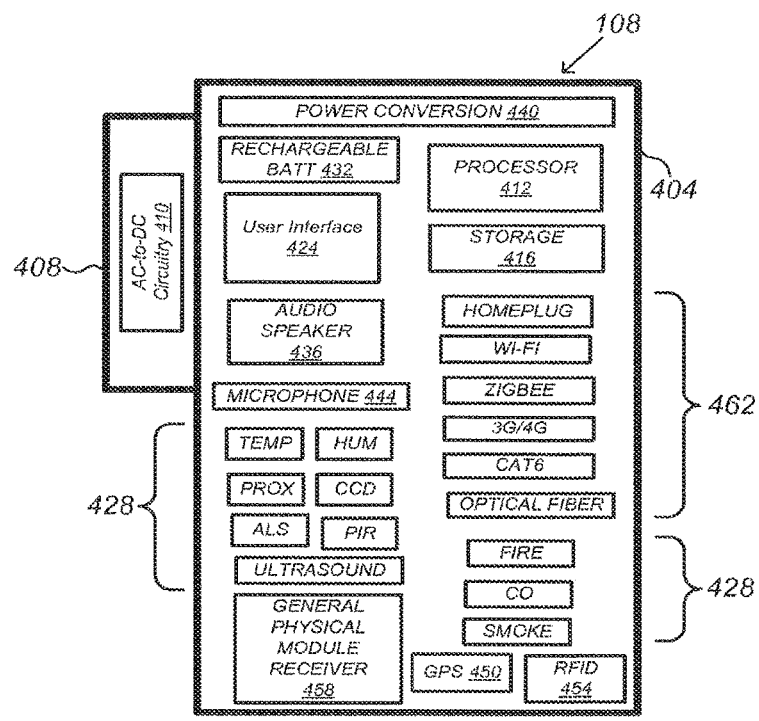
FIG. 4A is a simplified block diagram illustrating components of a wall switch according to embodiments.
Figure 4B:
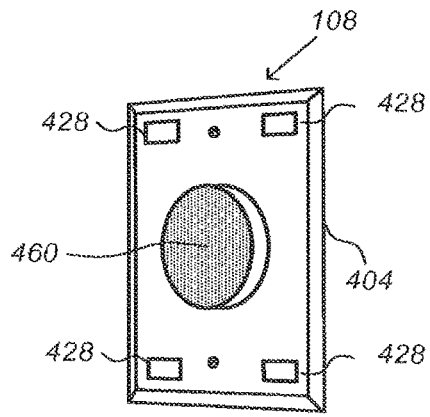
FIGS. 4B-C illustrate example modular head units for the wall switch of FIG. 4A, according to embodiments.
Figure 4C:
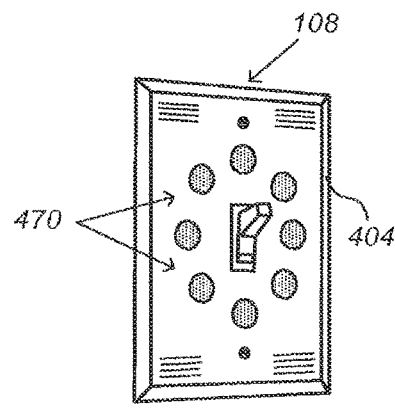

Turning now to FIGS. 4A-C, illustrations are provided of exemplary embodiments of the smart wall switch 108. According to embodiments, the wall switches 108 enhance the smart-home environment 100 by providing a retrofit wall light switch that, in addition to maintaining the basic character and purpose of a light switch, incorporates a host of host of sensing, interface, and communications capabilities for enhancing occupant comfort, convenience, and safety.

By virtue of being mounting in place of traditional wall switches, the wall switch 108 has access to plentiful electrical operating power, such as by connecting to wiring (e.g., to 120V "hot" line voltage wires) that is behind the walls 154 of the smart-home environment 100 and that is present at virtually all standard home wall light switches. This essentially unlimited power budget, the near-ubiquity of excellent installation locations throughout the home, and the reasonably ample physical space on its face plate and in its housing to fit the necessary components, combine to enable the wall switch 108 to accommodate a rich and wide variety of sensing, interface, and communications capabilities for the smart-home environment 100, as well as a general platform for the provision of even newer sensing, interface, and communications hardware as it becomes available over the coming decades.

A rich variety of new interactions are made possible between wall switch 108 and other devices of the smart-home environment 100. Occupancy sensing, for example, can be significantly enhanced by virtue of the great locations (usually right next to room doorways) of most wall light switches, allowing for easy tracking of occupants as they transition between rooms, predictive occupancy algorithms, and so forth.

FIGS. 4A-C illustrate exemplary user interfaces and hardware features of the wall switch 108. According to embodiments, at the core of the wall switch 108 is powering circuitry, including a rechargeable battery, for extracting power as needed from the 120V "hot" line voltage wire. The rechargeable battery can either be used as a conventional back-up source or as a reservoir to supply excess DC power if needed for short periods.

As illustrated in FIG. 4A, according to some embodiments, the wall switch 108 is split into two parts: a head unit 404 and a backplate 408. This bifurcation can increase the success and commercial longevity of the wall switches 108 by making them a modular platform consisting of two basic components. According to some embodiments, the backplate 408 is a permanent interface box (sometimes referred to herein as "docking station 408") that serves as a physical connection into the wall and to the 120V line voltage wires or other wiring of the smart-home environment 100, and that contains a AC-to-DC powering circuitry 410. When installed, the docking station 408 may resemble a conventional one-gang or two-gang wall box, except no dangerous high-voltage wires are exposed to the user. According to some embodiments, docking station 408 also includes a cellular wireless interface.

According to some embodiments, the head unit 404 (sometimes referred to herein as "replacement module 404") actually contains all of the sensors, processors, user interfaces, the rechargeable battery, and so forth. Users can plug and unplug the unit 404 in and out of the docking station 408. Many different commercial and functional possibilities for provisioning, maintenance, and upgrade are possible. For example, after years of using any particular head unit 404, a user will be able to buy a new version of the head unit 404 and simply plug it into the docking station 408. There are also many different versions for the head unit 404, such as an extremely low-cost version that is nothing but a motion/occupancy detector and light switch, and then a progression of increasingly-capable version, up to and including extremely fancy head unit 404 with small OLED televisions and high-fidelity mini-speakers. Thus, it should be appreciated that the various versions of the head units 404 can all be interchangeable, with any of them working when placed into any docking station 408. This can advantageously encourage sharing and re-deployment of old head units 404—for example, when an important high-capability head unit 404 (for the kitchen or living room, for example) can be replaced by a great new version of the head unit 404, then the old head unit 404 can be re-deployed in a bedroom or a basement, etc. When first plugged into a docking station 408, the head unit 404 can ask the user (by 2D LCD display, 2D/3D holographic projection, voice interaction, etc.) a few simple questions such as, "Where am I" and the user can select "bedroom" or "living room" and so forth.

According to some embodiments, the head unit 404 contains a main processor 412, storage 416, display and user interface 424, audio speaker 436, microphone 444, power converter 440, GPS receiver 450, RFID locater 454, and general physical module receiver 458. The head unit 404 further contains wireless and wired networking 462. In view of the ample power availability, a variety of communications capabilities can be provided, including Wi-Fi, ZigBee, 3G/4G wireless, CAT6 wired Ethernet, and even optical fiber from the curb. Furthermore, because the wall switch 108 can be connected to the home 120V system, a HomePlug or other powerline-communications capability can be provided.

Also included are sensors 428 such as temperature, humidity, occupancy, ambient light, fire, smoke, carbon monoxide, active proximity, passive infrared motion, ultrasound, CCD/video camera, etc. A rechargeable battery 432 is also included (or equivalently capable onboard power storage medium). For example, the battery 432 can be rechargeable Lithium-Ion battery. In operation, the wall switch 108 charges the battery 432 during time intervals in which the hardware power usage is less than what power stealing can safely provide, and that will discharge to provide the needed extra electrical power during time intervals in which the hardware power usage is greater than what power stealing can safely provide.

The user interface 424 can include one or more visual displays (TFT, OLED, etc.), touchscreen and/or button input capabilities, the audio speaker 436, and so forth. According to the embodiment illustrated in FIG. 4B, the module head unit 404 of smart wall switch 108 has a click-and-rotate annular ring input 460. According to this embodiment, the click-and-rotate annular ring input 460 of the wall switch 108 can be used as a dimming light switch. Further, the click-and-rotate annular ring input 460 can provide menu-driven interfaces for user governance of all its various capabilities. As illustrated in FIG. 4C, an optional 2D image and/or 3D holographic image projector 470, can also be provided so that the effective dimension of the display is not just limited to the physical size of the wall light switch. For example, in smart-home environments 100 that also include smart doorbells 106, the combination of the smart wall switches 108 and the smart doorbells 106 can bring about new features. For example, if a visitor approaches the front door or rings the doorbell 106, the camera in the doorbell 106 can transmit their image to the smart wall switches 108, which can instantly show the image on the dial of the light switch, or project the image in 2D or 3D (holographic) form. Further, for example, the image of the arriving visitor at the front door can be projected only from the smart wall switches 108 of those rooms where occupancy is sensed.

According to one embodiment that is particularly appealing for a lighting control functionality of the described the wall switches 108, which are temporarily simply termed 'light switches' for this lighting-control-related embodiment. The light switches in the home, such as the smart-home environment 100, are configured such that at least one of them can be used to control (a) all of the light switches in the home, (b) a single selectable one of the other light switches in the home, and/or (c) one or more selectable groups or sub-groups of the other light switches in the home. This can be particularly convenient, for example, for a light switch that is near the front door (or other entryway commonly used for ingress and egress) of the home. For such exemplary scenario, an occupant who is the last person to leave the home can simply turn off all lights at once by controlling the single light switch nearest the door. Similarly, a returning occupant can turn on a particular subset of lights (for example, the lights corresponding to a pathway from the front door to the kitchen) all at once by controlling that single light switch. As another advantageous example, a light switch that is in an upstairs master bedroom of the home can be used by the parents to control (a) the lights in all downstairs rooms in the home, (b) the lights leading between the master bedroom and the kitchen, and/or (c) the lights in each of the children's bedrooms.

The above-described provision for mutually controllable or selectively mutually controllable light switches can be extended in other embodiments to similar mutual or selectively mutual control of any population of smart-home controllers that are so amenable. Examples can include mutual or selectively mutual control of irrigation controllers, door opening/closing actuating controllers, entertainment device controllers, computing device controllers, portable plug-in heater controllers, window opening/closing controllers, and so on.

According to some embodiments, the above-described provisions for mutually controllable or selectively mutually controllable smart-home devices can be further enhanced by artificial intelligence algorithms capable of making rules-based or learning-based inferences based on sensed patterns of user control of smart-home devices, optionally in conjunction with sensed home conditions or other sensed user behaviors. By way of example, for one embodiment, one or more of the light switches is configured to process information acquired by home occupancy sensing devices in conjunction with information from light switch control behaviors of the user to produce a result in which the light switches are automatically self-programmed to help the user turn off all their home lights before leaving the home. More particularly, the artificial intelligence algorithms can be configured to sense whether there have been a threshold number of weekdays over the past month (or other evaluation period) for which, at roughly the same time of day ("X o'clock"), (i) the user has turned off a same or roughly same set of active light switches in the home, including the front door light switch, over a five-minute period (or other pre-departure period), and (ii) this event was followed by an extended period of non-occupancy, such as at least one hour of non-occupancy. If such pattern has been detected, the user can be sent a message on their smartphone allowing them to opt-in to a setting in which, if the light switch near the front door is turned off at about X-o'clock on a weekday, the set of active light switches will be automatically turned off as well.

By way of example, the opt-in message can say, "If you turn off the light switch near the front door at about X o'clock on weekdays, I can automatically turn off the rest of the lights for you that you have been turning off manually at about that time. It might save you a few steps! Would you like me to do this for you? [YES/NO]" The user can then opt in to this functionality. If the user's schedule changes and they end up not wanting this functionality later on, the artificial intelligence algorithms can readily 'unlearn' it by virtue of detecting a 'punishing' or 'undo' action by the user in which, the next time the user turns off the front door light switch, they simply walk to one of the automatically-turned-on light switches and turn it off within five minutes (or other undo interval). Thus, in accordance with the described embodiment, the collection of smart-home sensors is configured to automatically learn selected user behaviors, to assist the user with certain tasks when selected qualifying behaviors are observed, and to automatically stop providing such assistance when one or more straightforward undo actions are taken by the user.

Figure 5:
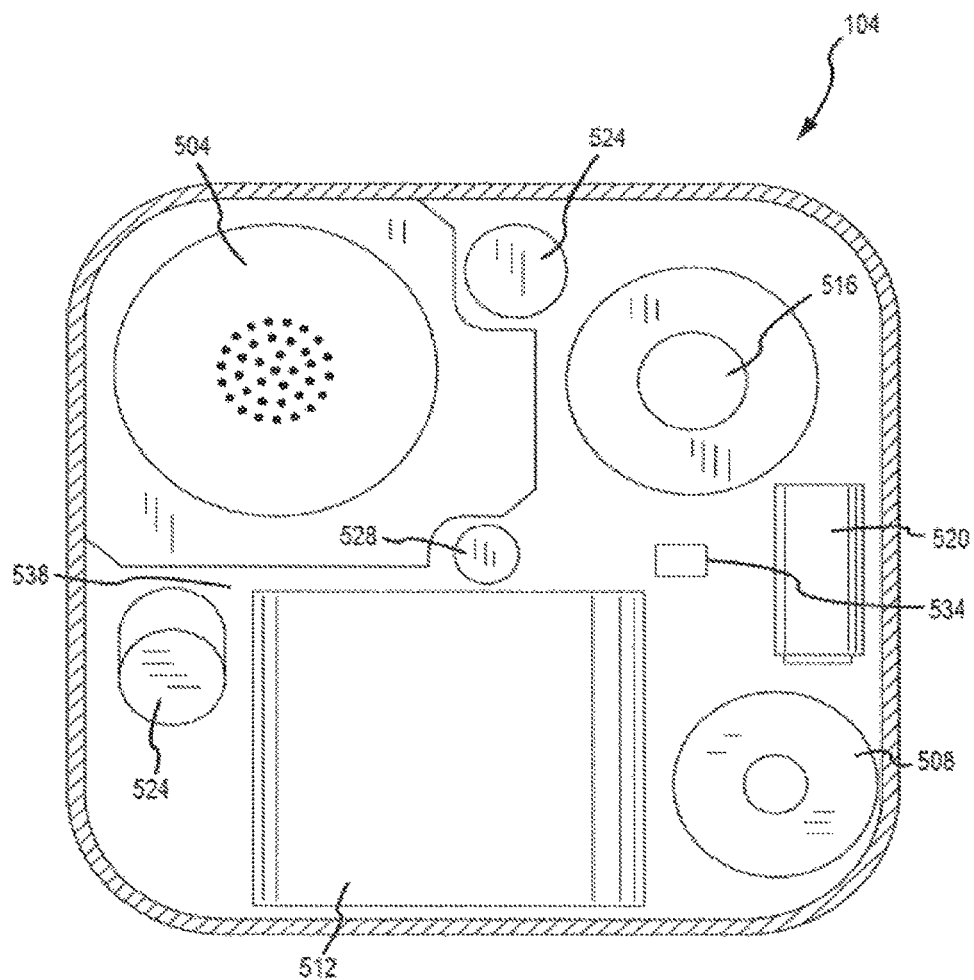
FIG. 5 is a simplified block diagram illustrating components of an intelligent, multi-sensing, network-connected wall light switch, according to embodiments.

Turning now to FIG. 5, an illustration is provided of an exemplary embodiment of the smart hazard detector 104. According to embodiments, an important underlying functionality of each smart hazard detector 104 is for smoke detection, fire detection, and carbon monoxide detection (more generally, "hazard detection") and associated audible alarming, via a speaker 504 and a buzzer 508. However, it should be appreciated that the smart hazard detector 104 is further enhanced with network-connectedness and a variety of multi-sensing capabilities that, while indeed enhancing home safety and security in many ways, can provide additional functionalities relating to HVAC control, home energy conservation, intra-home communications, and entertainment.

According to embodiments, the smart hazard detector 104 is a retrofit designed to replace older hazard detectors. Although not shown in the figures, the smart hazard detector 104 may comprise two primary components: a head unit 404 and a backplate or docking station 408. The head unit comprises the sensors, battery, processor, storage, and other components, while the docking station serves as a physical connection into the wall and, if applicable, to the 120V line voltage wires or other wiring of the smart-home environment 100. When installed, the docking station may resemble a conventional backplate for a tradition hazard detector. Users can plug and unplug the head unit in and out of the docking station. Thus, many different commercial and functional possibilities for provisioning, maintenance, and upgrade are possible. For example, after years of using any particular head unit, a user will be able to buy a new version of the head unit and simply plug it into the docking station. There are also many different versions for the head unit 404, such as an extremely low-cost version that is nothing but a smoke detector, and then a progression of increasingly-capable version, up to and including extremely fancy head units. Thus, it should be appreciated that the various versions of the head units can all be interchangeable, with any of them working when placed into any docking station. This can advantageously encourage sharing and re-deployment of old head units—for example, when an important high-capability head unit (for detecting hazards in the kitchen, for example) can replaced by a newer version, then the old head unit can be re-deployed in a bedroom or a basement, etc. When first plugged into a docking station, the head unit can ask the user (by 2D LCD display, 2D/3D holographic projection, voice interaction, etc.) a few simple questions such as, "Where am I" and the user can select "bedroom" or "living room" and so forth.

There can be substantial overlap between the smart hazard detector 104 and the wall switch 108, as well as the other devices of the smart-home environment 100 with respect to processing, sensing, user interface, and communications capabilities. The smart hazard detector 104 may be a low-power consuming device that is powered by battery 512 and that includes a low-power communication chip (such as a ZigBee chip) and may participate as a low-power node in the mesh network of the smart-home environment 100 by generating and transmitting messages, relay messages from other devices, as well as by "listen" and sometime making a corresponding response. However, it should be appreciated that instead of or in addition to being battery powered, the smart hazard detector 104 may be powered by AC voltage from the home. In some embodiments, the smart hazard detector 104 includes a WiFi chipset that enable it to communicate its status to other devices in the smart-home environment 100, to user mobile devices 166, to the central server or cloud-computing system 164, as well as to external managed security services. It should be appreciated that smart hazard detector 104 is microprocessor driven and that the WiFi chip may contain extra processing capacity for controlling all or some operations of the smart hazard detector 104. In some embodiments, a separate processor is provided.

According to the illustrated embodiment, the smart hazard detector 104 includes a smoke detector 516, which comprising a smoke photodiode, a detector, and a smoke chamber. The smoke photodiode may be, for example, an IR LED. Alternatively, instead of IR, a visible light LED or a laser may be provided. In some embodiments, the detector may be a photon silicon photomultiplier chip. The smoke photodiode and the detector may be programmed to execute a duty cycle every ten seconds, or so. For example, every ten seconds the photodiode and the detector will do an X-axes microsecond smoke test. The photodiode and the detector also execute self-calibration tests at predetermined intervals.

Further, the smart hazard detector 104 includes a carbon monoxide sensor 520, which can be either an electrochemical sensor or a metal oxide semiconductor. Additionally, the smart hazard detector 104 may include a temperature sensor, a humidity sensor for reducing false alarms associated with showering and cooking, and an ambient light sensor, such as a single pixel that measures the brightness of the room.

The smart hazard detector 104 may be provided with occupancy detecting capabilities. In some embodiments, one or more ultrasonic sensors 524 are provided for motion detecting. However, it should be appreciated that in addition to or instead of the ultrasonic sensors 524, one or more passive IR sensors 528 are provided for occupancy sensing. Having multiple ultrasonic sensor 524 and/or passive IR sensors 528 enhance the occupancy sensing capabilities of the detector. Because they are typical mounted in unobstructed locations, high on walls of often-occupied rooms, smart hazard detectors 104 are particularly well suited for occupancy detection, such as by the use of RFID, ultrasonic sensors, etc. The smart hazard detector 104 may also include a thermopile 534 for flame-heat detection. As it is well known in the art, the thermopile or thermo-camera 534 is a group of thermo couples that take infrared light and correlate that to flame heat. In some instances, this is advantageous because the thermo-camera looks into the room and gives advanced warning of heat. Thus, the thermo-camera 534 is able to "see" heat before the heat actually makes its way to the smart hazard detector 104.

According to embodiments, technologies including the sensors of the smart hazard detector 104 in combination with rules-based inference engines or artificial intelligence provided at a central server such as 164 are used to reduce the number of false alarms. For example, inferences about the occupants' activities can be learned based on data received over time. For example, if the smart hazard detector 104 located in the kitchen observes increased temperature, humidity, and motion in the kitchen, then an inference can be made that one or more of the occupants are cooking ("cooking inference"). These data inputs can be considered on a sliding scale based on time of day and day of week. For example, only slight increases temperature and humidity may invoke the cooking inference at 5 pm on weekdays, when history shows that when the occupants typically cook. However, much larger increases are required to invoke the cooking inference at 10 am on a weekday, when the occupants are typically away at that time. In some embodiments, when the cooking inference is made, the smart hazard detector 104 in the kitchen becomes less sensitive, whereas the hazard detectors 104 in other room remain in normal operation.

In some embodiments, the smart hazard detector 104 is equipped with one or more air quality sensors 538. For example, the air quality sensors 538 may "sniff" for volatile organic compounds (VOCs) that may present in the house. Thus, the smart hazard detector 104 can warn users when there are toxins in the user's home, such as when the user is burning a paraffin wax candle. Paraffin is a by-product of petroleum has been shown to release an alarming range of (VOCs), such as such as toluene and benzene. Also, for example, the air quality sensors 538 can "sniff" for gas leaks in the house, such as by detecting methane, which is commonly added to natural gas so as to make natural gas detectable. This "sniffing" capability is not only good for houses, but also for schools and hospitals. Individual will find peace of mind knowing such detection is in widespread use. Further, as houses get more and more sealed, air quality detection will grow in importance. Further, the air quality sensors 538 can measure levels of particulate, dust, pollen, mold, etc. detection.

In addition to measuring air quality and detecting harmful VOCs, the smart hazard detector 104 is capable of transmitting this information to the other devices in the home as well as the central server or cloud-computing system 164. For example, in some embodiments, when there are elevate levels of patent harmful gases, particulate, dust, pollen, mold, etc. in the home, the smart hazard detector 104 can transmit this information to the central server or cloud-computing system 164, which communicates with other nodes in the home and just outside of the home, such as the smart doorbell 106, and assess whether the inside air or the outside air is purer. If the outside air is purer, then the central server or cloud-computing system 164 instructs the smart thermostat 102 to open a vent to permit fresh air into the home, otherwise it instructs the thermostat 102 to recirculate air in the home and to not draw in outside air. Furthermore, the central server or cloud-computing system 164, upon receiving the air quality information from the hazard device 104, can send detailed information about the air quality to the mobile device 166 of user. For example, the air quality information may identify the specific types of toxins, particulate, dust, pollen, mold, etc. in the air. This can help the user identify which pollen, etc. the user is allergic to. Further, the central server or cloud-computing system 164 can use the air quality information to provide the user with medication recommendations (e.g., be sure to take you allergy pills today). Furthermore, the central server or cloud-computing system 164 can aggregate data received from multiple home in various geographic locations and provide, for example, smog alerts, pollen warnings, etc.

According to some embodiments, the smart hazard detector 104 may include a carbon dioxide ($CO_2$) sensor for fire detection, where detector includes a passive IR detector from lead selenide. Fire produces CO, $CO_2$, and infrared light. The intensity of the infrared light emitted by the flame is pretty constant, until it passes through the layer of $CO_2$ produced by the fire. However, the frequency of light having a wavelength of 4.26μ excites $CO_2$ molecules when the light contacts the $CO_2$. In response, the $CO_2$ absorbs the infrared light having a wavelength of 4.26μ, thereby decreasing the intensity of the light at this wavelength. Thus, to detect fire, a narrow optical bandpass filter is placed in front of the lead selenide IR detector to permit only light having a wavelength 4.26μ to pass through to the lead selenide IR detector. In the event of fire, the lead selenide detects the decrease in intensity of light at a wavelength of 4.26μ and triggers the fire alarm.

According to embodiments, technologies including the sensors of the smart hazard detector 104 in combination with rules-based inference engines or artificial intelligence provided at a central server such as 164 are used to warn occupants of dangerous conditions in the home. For example, an inference can be made that an occupant is burning a candle based of the qualities (e.g., intensity, wavelength, frequency, etc.) of the light and/or the toxins begin released into the air. Further, an inference can be made that the occupant in the room has fallen asleep when the occupant is in the room and has not moved for a predetermined period of time. In situations where a candle is burning and the occupant has fallen asleep, the smart hazard detector 104 in that room will sound an alarm to wake up the occupant. In other example, the smart hazard detector 104 can sound an alarm or send an alert text or email message when it detects dangerous conditions in unoccupied rooms, such as when the stove is left on in the kitchen.

In the event a fire does occur in the home, technologies including the sensors of the hazard detectors 104 in combination with rules-based inference engines or artificial intelligence provided at a central server such as 164 are used to determine the cause. For example, the smart hazard detector 104 can detect that the fire started in the kitchen, and the smart hazard detector 104 can detect an active stove, candle, etc. was left unattended in the kitchen just before the fire started. Additionally, a central server such as 164 can aggregate data from multiple homes that experienced a fire, analyze the data to find patterns and reconstruct what caused the fires, and share this information with fire departments.

In some embodiments, the smart hazard detector 104 is mounted in a location that is out-of-reach of the occupants, such as high on a wall or on a ceiling. Thus, in the event of a false alarm, the occupants cannot reach the smart hazard detector 104 to press a button that deactivates the alarm. Accordingly, embodiments of the smart hazard detector 104 allows for occupants to deactivate the alarm using "silence gestures". For example, the smart hazard detector 104 detects a particular "silence gesture" from one of the occupants and, in response, deactivates the alarm.

According to embodiments, the one or more ultrasonic sensors 524 of the smart hazard detector 104 are used to detect the "silence gesture" of the occupant. In some embodiments, each of the ultrasonic sensors 524 may contain multiple piezos so as to make the sensor "omni-directional" and to make it easier to detect when an occupant is making a silence gesture. Using ultrasonic sensors 524 in battery-powered versions of the smart hazard detector 104 is particularly advantageous because ultrasonic sensors 524 consumer very little power. The ultrasonic sensors 524 work by sending out pulses and then calculating the time interval between sending the pulse and receiving a corresponding echo to determine the distance to an object. In some embodiments, a single piezo of the ultrasonic sensor sends the pulse and receives the echo. In other embodiments, separate piezos send pulses and receive echoes.

During normal operation, the ultrasonic sensors 524 of the smart hazard detector 104 are merely performing occupancy sensing functions. For example, they are determining whether the room is occupied. When performing this function, the ultrasonic sensors 524 have a ping rate of about one hertz. This low ping rate is designed to preserve battery power, while still effectively performing occupancy detection. However, when one of the other sensors, such as the smoke, fire, or carbon monoxide sensors, activates the alarm, the smart hazard detector 104 increases the ping rate, such as up to twenty hertz. The increased ping rate better enables detection of "silence gestures", which are only made when the alarm is active. When detecting a "silence gesture", the ultrasonic sensors 524 are "looking for" an object, such as a human hand, to remain within in a predefined distance from the smart hazard detector 104 for a specified period.

Figure 6:
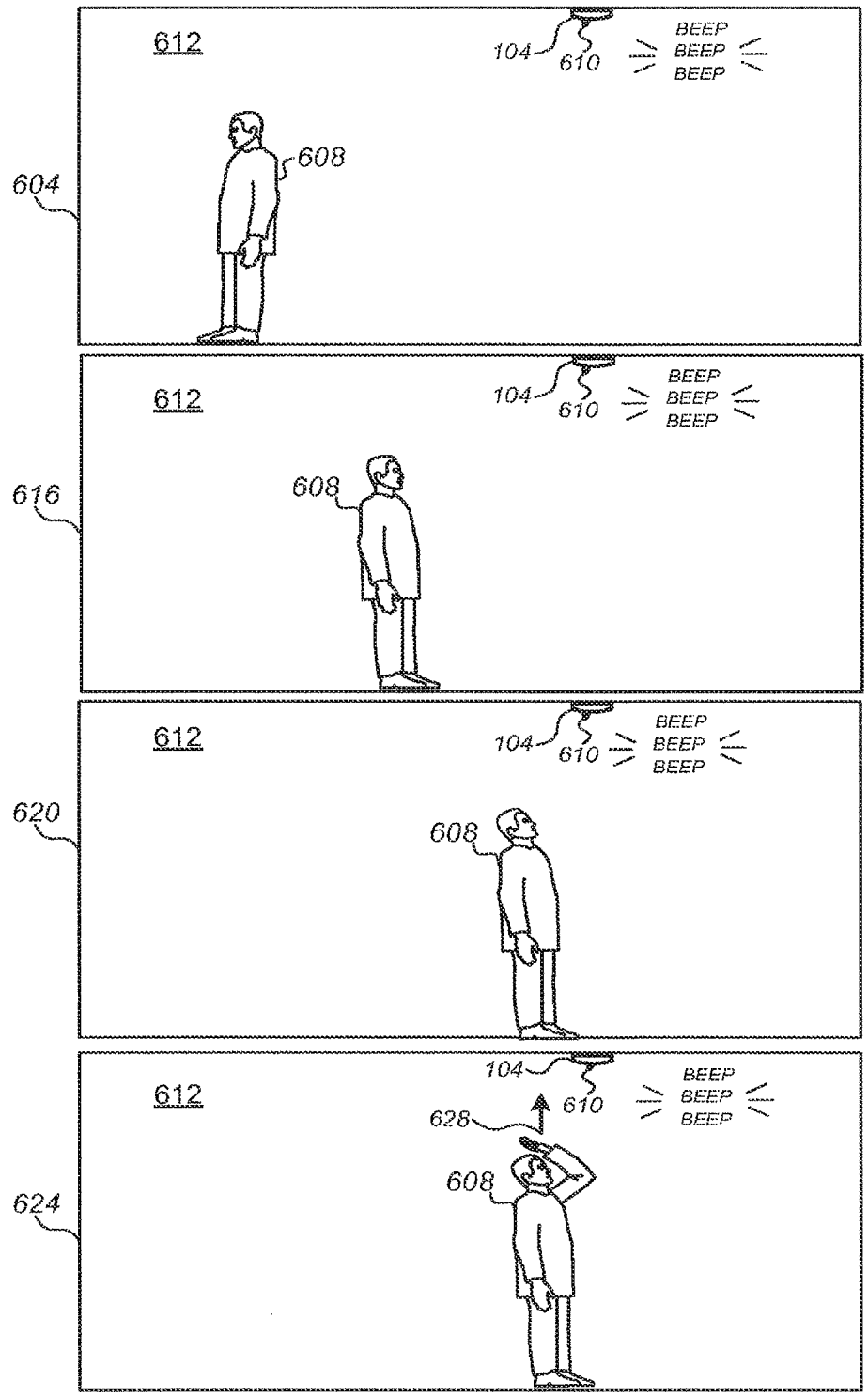
FIG. 6 is a schematic diagram illustrating a silence gesture for remotely deactivating an alarm, according to embodiments.

An example "silence gesture" will be described with references to FIGS. 6 and 7. As shown in FIG. 6 at block 604, an occupant is standing in room 612 while an alarm in hazard detector 104 is active and making a "BEEP" sound. A light 610, such as an LED, is provided on an outer portion of the smart hazard detector 104, such that the occupant 608 can see the light 610 when it is turned on. The operation of the light 610 will be described with reference to FIG. 7.

Suffice to say for FIG. 6, the light is turned off in blocks 604 through 624. As shown at block 616, the occupant 608 has walked to a position closer to the smart hazard detector 104, which is mounted out of reach on the ceiling of the room. As shown at block 620, the occupant 608 walked to a position even closer to the smart hazard detector 104, such that the occupant 608 is almost directly under the smart hazard detector 104. As shown at arrow 628 of block 624, the occupant 608, while standing almost directly under the smart hazard detector 104, is beginning to extend an arm upward, toward the smart hazard detector 104.

Figure 7:
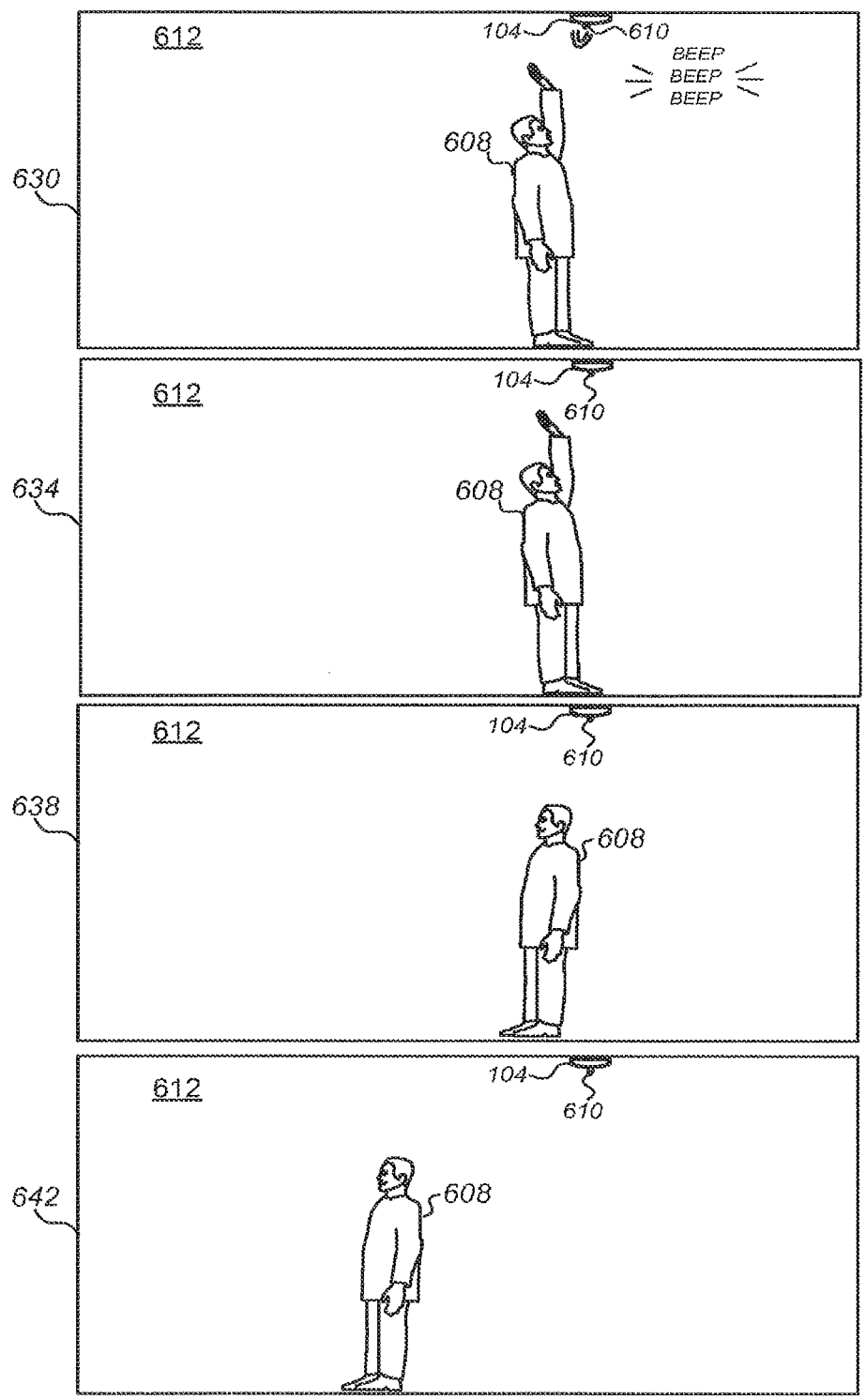
FIG. 7 is a schematic diagram illustrating a silence gesture for remotely deactivating an alarm, according to embodiments.

Referring now to block 630 of FIG. 7, the arm of the occupant 608 is extended upward, toward the smart hazard detector 104, while the occupant is standing almost directly under the smart hazard detector 104. After an alarm sounds and the pulse rate increases, the ultrasonic sensor the smart hazard detector 104 "looks" for a trigger to the "silence gesture" period, which is the amount of time the "silence gesture" must be maintained to deactivate the alarm. According to some embodiments, the trigger is a distance change from a baseline, and to deactivate the alarm the distance change must be maintained for the entire "silence gesture" period (e.g., three seconds). For example, if the baseline is a distance between the sensor and the floor of the room, then the sensor is looking for an object to come in between it and the floor, thereby changing the distance measured by the sensor. In some embodiments, the distance change must be significant enough to ensure that someone is close and likely intends to silence the alarm. For example, if the distance to the floor is ten feet, then the requisite distance change could be eight feet or eighty percent of the original distance. As such, the object would be required to be within two feet of the sensor to trigger the "silence gesture" period, and to deactivate the alarm, the object must remain there for the duration of the period. The requisite distance change can be configured based on the height of the ceiling and based on the height of the occupants, among other things.

Referring still to block 630, the light 610 is turned on when the occupant 608 successfully triggers the "silence gesture" period, thereby signaling to the occupant 608 to remain in the position for the requisite period, such as three seconds. Here, the hand of the occupant 608 triggered the "silence gesture" period. A tolerance is built in such that if the occupant 608 slightly moves and loses but quickly regains the signal, the "silence gesture" period will continue without having to start over. As shown in block 634, the occupant kept the hand in within the requisite distance of the sensor for the duration of the "silence gesture" period and, thus the alarm has been deactivated, the "BEEP" has stopped, and the light 610 has turned off. As shown at blocks 638 and 642, the occupant 608 can walk away from the smart hazard detector 104 and resume normal activity.

It should be appreciated that, in the event the smart hazard detector 104 is of a design that receives reliable power from the wiring of the home (rather than being batter powered), a CCD chip could be used to detect the "silence gesture". However, such an arrangement is not suitable for battery-powered hazard detectors 104 because the CCD chips and associated processing consume a large amount of power and would quickly drain the battery. Other possible alternatives to ultrasonic sensors 524 include passive IR sensors, thermopile (e.g., thermo-cameras), laser-distance measuring, laser and a camera combination because camera looks for dot instead of time of arrival (Doppler shift), and a full on camera and image processing system.

According to some embodiments, to enhance the reliability and effectiveness of the silence gesture, the ultrasonic sensor 524 could work in concert with the passive IR sensor to make the sensing even better. For example, when an occupant attempts to silence by placing a hand in field, the passive IR will sense this, and thereby trigger the "silence gesture" period. The ultrasonic sensor 524 could also work in concert with the thermopile (e.g., thermo-camera), where both distance change and heat are used to detect the silence gesture. For example, the thermo-camera detects when human hand is nearby and triggers the "silence gesture" period. Further, the ultrasonic sensor 524 could work in concert with the ambient light sensor. For example, when the places a hand in the field and blocks light, then the ambient light sensor know the occupant is nearby and thus triggers the "silence gesture" period.

It should be appreciated that, according to embodiments, similar "gesture" controls can be applied to other smart devices in the home, such as to the smart thermostat, the smart wall switches, etc. For example, there can be gestures for increasing or decreasing temperature controls, for turning on and off lights, HVAC, etc.

Figure 8A:
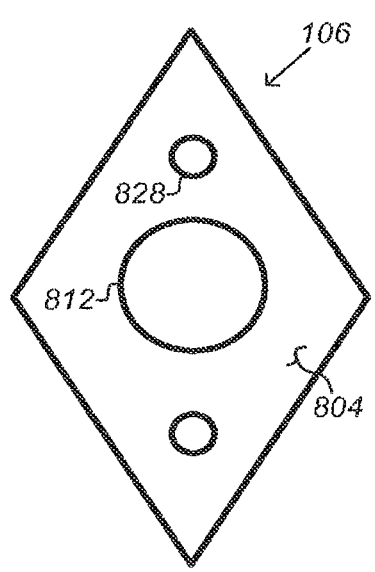
FIGS. 8A-B are simplified block diagrams illustrating components of an intelligent, multi-sensing, network-connected entryway interface device, according to embodiments.

Turning now to FIG. 8, an illustration is provided of an exemplary embodiment of a smart doorbell 106. According to embodiments, an important underlying functionality of the smart doorbell 106 is to serve as a home entryway interface unit, providing a doorbell functionality (or other visitor arrival functionality), audio/visual visitor announcement functionality, and like functionalities. Like the smart hazard detector 104 described above with reference to FIGS. 5-7, the smart doorbell 106 is further enhanced with network-connectedness and a variety of multi-sensing capabilities to accommodate additional functionalities, and there can be substantial overlap/integration among the smart doorbell 106, the smart hazard detector 104, the smart wall switch 108, and the smart wall plug 110 that leverages their combined processing, sensing, and communications capabilities, as well as their access to cloud-based control and intelligence.

In some embodiments, the smart doorbell 106 is connected to the wiring of the smart-home environment 100. For example, as is common in many homes, a 24V low voltage wire is provided at the outer entry points of the home, such as at the front, back, and side doors. The smart doorbell 106 can be connected to this 24V low voltage wire to obtain steady and reliable power. However, it should be appreciated that the smart doorbell could include a battery for the purpose of replacing or supplementing power obtained from the home wiring. In some embodiments, the battery could be a rechargeable battery, such as a rechargeable Lithium-Ion battery, for extracting power as needed from the house wiring (e.g., 24V low voltage wire). For example, the smart doorbell 106 could charge the battery during time intervals in which the doorbell's power usage is less than what the 24V low voltage wire can safely provide, and that will discharge to provide the needed extra electrical power during time intervals in which the hardware power usage is greater than what the 24V low voltage wire can safely provide. Thus, the rechargeable battery could be used as a conventional back-up source or as a reservoir to supply excess DC power if needed for short periods.

Figure 8B:
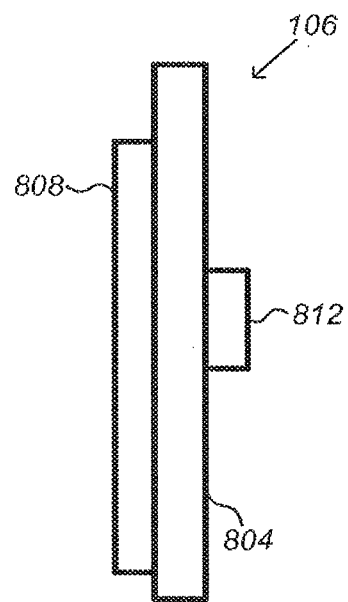

As illustrated in FIG. 8B, according to some embodiments, the smart doorbell 106 includes two parts: a head unit 804 and a backplate 808, which is also referred to as a docking station 808. This bifurcation can increase the success and commercial longevity of the wall switches 108 by making them a modular platform consisting of two basic components. As with the wall switches 108 and the hazard detectors 104, this bifurcation can increase the success and commercial longevity of the smart doorbells 106 by making them a modular platform. The docking station 808 is a permanent interface box that serves as a physical connection into area near the entry way, such as a doorframe or outer wall of the home, and to the voltage wires of the home. According to some embodiments, the head unit 804 (sometimes referred to herein as "replacement module 804") actually contains all of the sensors, processors, user interfaces, the rechargeable battery, and so forth. Users can plug and unplug the unit 804 in and out of the docking station 808. Many different commercial and functional possibilities for provisioning, maintenance, and upgrade are possible. For example, after years of using any particular head unit 804, a user will be able to buy a new version of the head unit 804 and simply plug it into the docking station 808. There are also many different versions for the head unit 804, such as an low-cost versions with few features, and then a progression of increasingly-capable versions, up to and including extremely fancy head units 804 with a large number of features. Thus, it should be appreciated that the various versions of the head units 804 can all be interchangeable, with any of them working when placed into any docking station 808. This can advantageously encourage sharing and re-deployment of old head units 804—for example, when an important high-capability head unit 804 (for the front door, for example) can replaced by a great new version of the head unit 804, then the old head unit 804 can be re-deployed to a back or basement door, etc. When first plugged into a docking station 808, the head unit 804 can ask the user (by 2D LCD display, 2D/3D holographic projection, voice interaction, etc.) a few simple questions such as, "Where am I" and the user can select "front door" or "back door" and so forth.

Sensors devices such as temperature, humidity, occupancy, ambient light, fire, smoke, carbon monoxide, active proximity, passive infrared motion, ultrasound, CCD/video camera, bar code scanner, etc., as well as I/O devices such as speakers, user interfaces, 2D/3D projectors, etc. are provided in the head unit 804. The sensors and I/O devices are generally represented at 828.

According to embodiments, technologies including the sensors 828 in combination with rules-based inference engines or artificial intelligence provided at a central server such as 164 are used to detect when packages are delivered to the door of the smart-home environment 100, and to take a variety of automated actions in response. According to some embodiments, the sensors 828 can "see" the uniform of the delivery person approaching the door or the truck of the delivery person, or the sensors can "hear" the truck in combination with a person approaching the door within a period after hearing the truck. Once the person is with a predetermined distance from the door, the smart doorbell 106, using its speaker, asks the person is he or she is a delivery person, to which that person can reply with an audible response or by indicating as such on the user interface of the doorbell. If the person is making a delivery, the doorbell can instruct the person to place the package in a location proximate the doorbell 106 such that its scanner can scan the bar code or other type of identifying tag affixed to or associated with the package being delivered.

According to embodiments, in the A central server, such as server 164, can use the bar code to obtain information about the package, such as the sender, recipient, a description of the item therein, whether signature is required, etc. Based on this information the rules-based inferences engines or artificial intelligence can make inference regarding which action to take next. For example, if occupants or more particularly if the specified recipient or recipients are in the home and the package is from a sender or contains an item that is of particular interest to the one or more the occupants, an announcement can be made in the home, indicating the package is currently being dropped off and providing details about the package. On the other hand, the sender or item is not of particular interest to one of the occupants based on the occupants past responses to receiving such deliveries, then no announcement will be made and the occupants can discover the package in due course. Similarly, if no occupants are home but an inference is made that the package is of particular interest to one of the occupants, a text message, email, phone call, etc. can be made the one or more identified occupants, indicating that the package in being delivered.

According to embodiments, in the event signature is required for the package but none of the occupants are home or an inference is made to not disturb the occupants, the smart doorbell can provide authorization to leave the package. For example, the doorbell 106 present an authorization code (either in plain text, barcode, or encrypted forms) on its user interface and prompt the delivery person to use his or her handheld device to record, scan, photograph, or other acquire the authorization code. Once the authorization code has been acquired by the delivery person, the doorbell 106 can then instruct the delivery person regarding where to leave the package, such as at the front door, around the back of the house in a discrete location, etc.

According to embodiments, technologies including the sensors 828, such as noise, motion, and/or facial recognition detecting, in combination with rules-based inference engines or artificial intelligence provided at a central server, such as server 164, are used to detect when one or more unknown individuals are approaching the home. A number of learned inferences can be made in this situation. For example, during late evening hours, an alarm will be sounded in the house, giving notice of the approaching person and/or the doorbell 106 may audible announce to the individual that he or she is being monitored by a home security system. Further, in the event the person attempt to enter a door, window, or other access point to the home, an message will be sent to local law enforcement. However, during day time hours when one or more occupants are at home, a learned inference can be made to take no action, such as when a meter reader, mail carrier, garbage collector, etc. is approaching the house as per a reasonably predictable and learned schedule.

According to embodiments, when the central server such as server 164, based on information received from the doorbell 106, such as noise and motion data, determines that the street adjacent to the home has a threshold level of traffic, the inferences are made regarding the safe of the children residing at the home. For example, an alarm can be triggered in the home in the event one or more of the children are detected by the occupancy sensing to be outside of the home. This alert enables the parents or other caretakers to quickly take actions to protect the child from the traffic. Further, for example, automatic adjustments are made to audio equipment in the home of account for the increased traffic noise, such as by increasing the volume a proportionate amount.

As discussed, the sensors 828 may include temperature and humidity sensors, the data from which may be used for a number of useful services. For example, the outside humidity and temperature data is consider by the thermostat 102 when controlling the HVAC to best accomplish the occupants' desired comfort preferences. Further, for example, this information may be presented to the occupants through a number of user interfaces, such as a user interface associated with another one of the devices located inside of the home, the television, mobile and other computing devices, or audibly. In some instances, a central server such as server 164 collects this information from a plurality of smart home across a plurality of geographic locations. This aggregated data may be sold to weather services or may be used to provide weather data to smart home occupants.

According to embodiments, the smart doorbell 106 includes a button 812 that, upon being touched, depressed, or otherwise activated, causes as audible notification to be broadcasted within the home or a message to be sent to user interfaces of devices within the home or to a mobile device associated with occupants of the home. Learned inferences can be made regarding the appropriate response to activation of the button 812. For example, the audible notification is only broadcast in occupied rooms, or rooms occupied by one or more occupants who have a relationship with the person at the door, or no alarm is sound in rooms where occupants, such as small children, are determined to be sleeping. Also, for example, the occupant-selected songs, such as uploaded MP3's, may be broadcasts in the home, where different songs may be broadcast for different occupants at home at the time or based on the identity of the person at the door. Further, for example, technologies and sensors at the smart doorbell 106 may identify the person based on facial recognition or based on other characteristics such as the manner in which the person approached the door. For example over time, based on input received from the smart doorbell 106 a central server can build up an address book of profile data about people who approach the door, such as some identifying biometric data. For example, the address book can be built over time using low-resolution data such as ultrasonic, passive IR, etc. to create a unique signature for individuals. This combined data from different domains and becomes almost like a fingerprint regarding how that person approaches the house. In some instances, when a "familiar" person approaches the door, the smart doorbell 116 "asks" the person if he is "John Doe", to which the person can verbally or physically respond. Upon obtaining this information John Doe's name or image can be announced or projected on device in the home and/or John Doe will be given certain access rights to the home, such as for example the door will automatically unlock as he approaches. Further, in addition to or instead of identification based on these unique "signatures", individuals may enable their mobile devices to communicate with the smart doorbell 116, such as via Bluetooth, NFC, or other wireless protocols. Also, for example, individual may "swipe" their smart phones in front of the smart doorbell's RFID scanner. Upon identifying the individual, the smart doorbell may give the individual certain access right to the home, such as by automatically unlocking the door.

Figure 9:
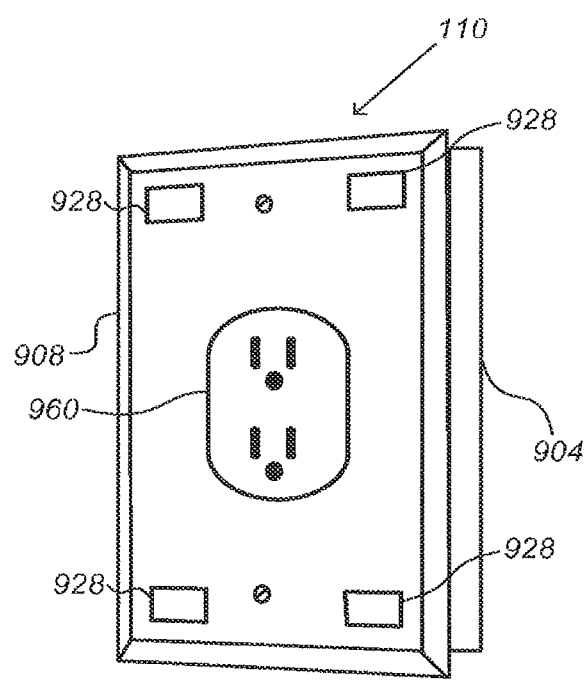
FIG. 9 is a schematic diagram illustrating an intelligent, multi-sensing, network-connected wall plug, according to embodiments.

According to embodiments, technologies including the sensors 828 in combination with rules-based inference engines or artificial intelligence provided at a central server, such as server 164, also make learned Turning now to FIG. 9, an illustration is provided of an exemplary embodiment of a smart wall plug 110. According to embodiments, the smart wall plugs 110 enhance the smart-home environment 100 by providing a retrofit wall plug that, in addition to maintaining the basic character and purpose of a wall plug, incorporates a host of host of sensing and communications capabilities for enhancing occupant comfort, convenience, and safety. Much like the smart wall switches 108, by virtue of being mounting in place of traditional wall plugs, the smart wall plugs 110 have access to plentiful electrical operating power, such as by connecting to wiring (e.g., to 120V "hot" line voltage wires) that is behind the walls 154 of the smart-home environment 100 and that is present at virtually all standard home wall plugs. This unlimited power budget, the numerous installation locations throughout the home, and the reasonably ample physical space in its housing to fit the necessary components, combine to enable the smart wall plugs 110 to accommodate a rich and wide variety of sensing and communications capabilities for the smart-home environment 100, as well as a general platform for the provision of even newer sensing and communications hardware as it becomes available.

A rich variety of new interactions are made possible between the smart wall plugs 110 and other devices of the smart-home environment 100. Occupancy sensing, for example, can be enhanced by virtue of the numerous installation locations of wall plugs through the home, albeit some of these locations are hidden behind furniture. According to embodiments, the smart wall plugs 110 can include all or some of the components that are included in the wall switch 108, as illustrated in FIGS. 4A-C. For example, the smart wall plugs 110 can be comprised of two primary parts: a head unit 908 and a docking station 904, which is a permanent interface box that serves as a physical connection into the wall and to the 120V line voltage wires or other wiring of the smart-home environment 100. This bifurcation can increase the success and commercial longevity of the smart wall plugs 110 by making them a modular platform consisting of two basic components. According to embodiments, the head unit 908 contains the sensors, processors, the I/O devices and receptacles, and so forth. Users can upgrade and/or redistribute wall plug functionality throughout the home by plugging and unplugging head units of varying capabilities in and out of the docking stations in various locations throughout the home. For example, head units 908 having advanced occupancy sensing can be plugged into docking stations located in area having clear lines of sight in commonly occupied rooms, rather than behind furniture in or unused rooms. Also, for example, head units having advance communication capabilities are plugged into docking stations associated with high-energy consuming appliances, such as a clothes dryer. As discussed, these head units may be capable of wirelessly communicating with smart meters and corresponding providing power to the clothes dryer at off-peak hours. Because this head unit may be located behind a clothes dryer in a rarely-occupied laundry room, it is unnecessary for this head unit to include advanced occupancy sensors, for example.

According to some embodiments, the head unit 908 includes a standard duplex receptacle 960 having upper and lower outlets, each having three slots. The head unit 908 further contains some or all of a main processor, storage, audio speaker, microphone, power converter, GPS receiver, RFID locater. Additionally, The head unit 908 may include wireless and wired networking. In view of the ample power availability, a variety of communications capabilities can be provided, including Wi-Fi, ZigBee, 3G/4G wireless, CAT6 wired Ethernet, and even optical fiber from the curb. Furthermore, because the smart wall plug 110 can be connected to the home 120V system, a HomePlug or other powerline-communications capability can be provided (See FIGS. 4A-C for example illustrations of such components being provided on a wall switch 108). It should also be appreciated that the smart wall plugs 110 may include sensors 928 such as temperature, humidity, occupancy, ambient light, fire, smoke, carbon monoxide, active proximity, passive infrared motion, ultrasound, CCD/video camera, etc.

According to embodiments, the smart wall plugs 110 wirelessly communicate with smart meters, which are electrical meters that record consumption of electric energy in time intervals and then transmits that information a local radio receiver, which forward the information to utility companies. Utility companies use this data to charge varying rates. For example, power used midday during peak hours is more expensive than energy used at night during off-peak hours. The smart wall plugs 110 communicate with the smart meter of the home to obtain power-usage data. This data can be forwarded to a central server such as server 164. Rules-based inference engines or artificial intelligence provided at a central server such as 164 to make decisions regarding how to efficiently operate certain appliances in the home, so as to reduce energy costs, yet also satisfy the occupants' preferences. For example, decisions are made regarding use appliances for non-essential tasks at night (e.g., wash dishes at night), and to permit essential tasks when necessary (e.g., allow refrigerator compressor to turn on mid-day). Furthermore, a central server can be programmed with safe operating parameters for each application in the smart home, and can shutoff power to the appropriate wall plug 110 when the corresponding application deviates from its safe operating parameters. Furthermore, the intelligence of the central process can be used for safety. For example, in the event data from an occupancy sensor on a particular wall plug 110 indicates that a small child is really close the wall plug, the central server may shut off power to that plug. Further, as a general rule, the central server may shut off power to all wall plugs that do have an appliance other type of power consuming device plugged into it. Further, user can remotely control, such as by use of their mobile device, the outlets in the home. For example, a parent may want to shutoff power to all wall plugs 110 in their child's room, or that are outside of the home and there is some risk that a child may be attracted to the plug.

Figure 10A:
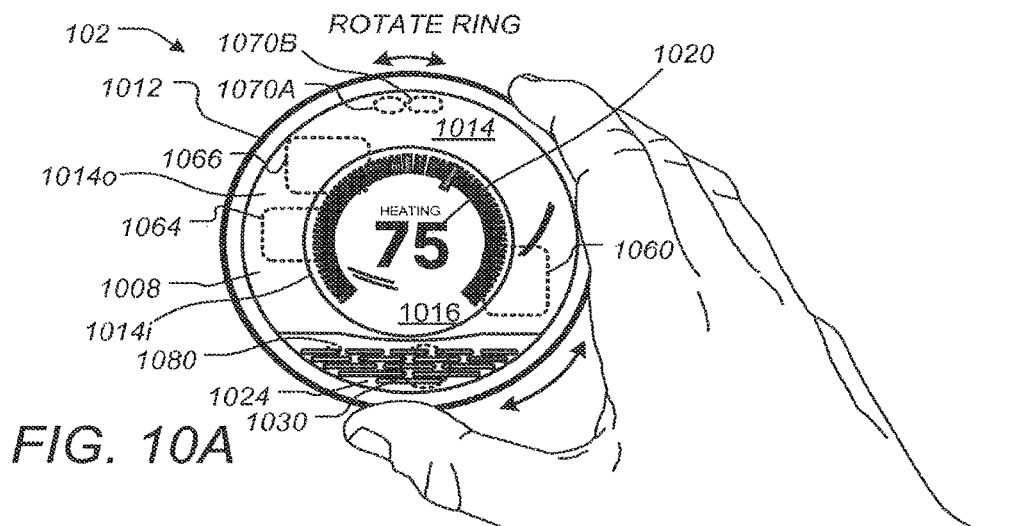
FIGS. 10A-C are schematic diagrams illustrating an intelligent, multi-sensing, network-connected thermostat, according to embodiments.
Figure 10B:
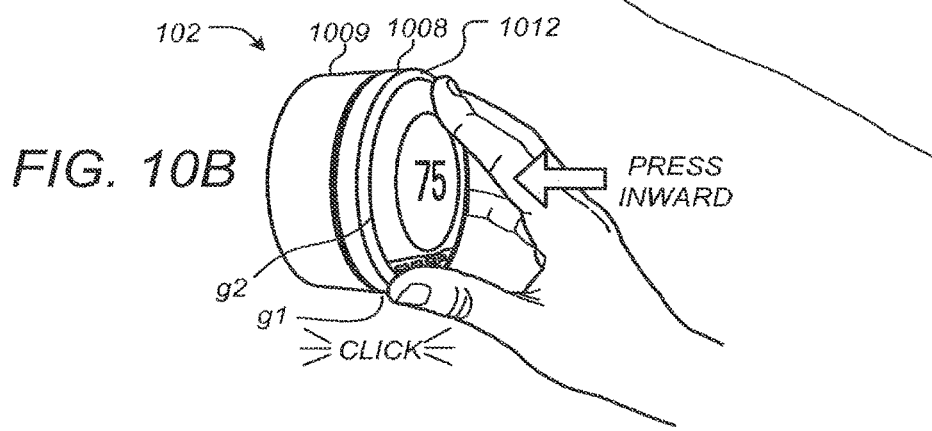

Turning now to FIGS. 10A-B, illustrations of a smart thermostat 102 are provided, according to some embodiments. Unlike many prior art thermostats, smart thermostat 102 preferably has a sleek, simple, uncluttered and elegant design that does not detract from home decoration, and indeed can serve as a visually pleasing centerpiece for the immediate location in which it is installed. Moreover, user interaction with smart thermostat 102 is facilitated and greatly enhanced over known conventional thermostats by the design of smart thermostat 102. The smart thermostat 102 includes control circuitry and is electrically connected to an HVAC system, such as is shown with unit 100 in FIGS. 1 and 2. Smart thermostat 102 is wall mounted, is circular in shape, and has an outer rotatable ring 1012 for receiving user input. Smart thermostat 102 is circular in shape in that it appears as a generally disk-like circular object when mounted on the wall. Smart thermostat 102 has a large front face lying inside the outer ring 1012. According to some embodiments, smart thermostat 102 is approximately 100 mm in diameter.

The outer rotatable ring 1012 allows the user to make adjustments, such as selecting a new target temperature. For example, by rotating the outer ring 1012 clockwise, the target temperature can be increased, and by rotating the outer ring 1012 counterclockwise, the target temperature can be decreased. The smart thermostat 102 may be configured to receive a plurality of types of inputs by virtue of the rotatable ring 1012, such as a scrolling input and a selection input. For example, a rotation of the ring may allow a user to scroll through an array of selection options, and inwards pressure exerted on the ring (inward click) may allow a user to select one of the options (e.g., corresponding to a particular scroll position).

The outer rotatable ring 1012 may include a component that may be physically rotated, or, in other embodiments, a static component that may sense a user's virtual rotation of the ring. For some embodiments, the outer rotatable ring 1012 may include a touch pad configured to track arcuate motion of a user's finger on the touch pad. The touch pad may comprise, e.g., a ring-shaped or circular area. In some instances, the touch pad includes multiple portions (e.g., to detect arcuate motion in a first ring-shaped area and to detect tapping in a second inner circular area). Boundaries of a touch pad area may be identified to a user using, e.g., visual or tactile cues. For example, a ring-shaped touchpad area may be indented compared to neighboring areas on the smart thermostat 102, or the area may be a different color than neighboring areas.

For preferred embodiments such as those of FIG. 10A in which the outer ring 1012 is a continuous loop without fiducial markers, one or more advantages are brought about. Thus, a user may physically rotate the ring (in embodiments in which the ring is configured to be physically rotatable) regardless of a starting position of the ring. Further, a user may select, e.g., a value of a variable (e.g., select a particular menu, a particular setpoint temperature value, etc.) by rotating the ring multiple times. This feature may be particularly advantageous as the user need not worry about precise rotations in order to select a desired option.

The front face of the smart thermostat 102 comprises a clear cover 1014 that according to some embodiments is polycarbonate, and a metallic portion 1024 preferably having a number of slots formed therein as shown. According to some embodiments, the surface of cover 1014 and metallic portion 1024 form a common outward arc or spherical shape gently arcing outward, and this gentle arcing shape is continued by the outer ring 1012.

Although being formed from a single lens-like piece of material such as polycarbonate, the cover 1014 has two different regions or portions including an outer portion 1014o and a central portion 1014i. According to some embodiments, the cover 1014 is painted or smoked around the outer portion 1014o, but leaves the central portion 1014i visibly clear so as to facilitate viewing of an electronic display 1016 disposed thereunderneath. According to some embodiments, the curved cover 1014 acts as a lens that tends to magnify the information being displayed in electronic display 1016 to users. According to some embodiments the central electronic display 1016 is a dot-matrix layout (individually addressable) such that arbitrary shapes can be generated, rather than being a segmented layout. According to some embodiments, a combination of dot-matrix layout and segmented layout is employed. According to some embodiments, central display 1016 is a backlit color liquid crystal display (LCD). An example of information displayed on the electronic display 1016 is illustrated in FIG. 10A, and includes central numerals 1020 that are representative of a current setpoint temperature.

Particular presentations displayed on the electronic display 1016 may depend on detected user input. For example, one of a plurality of variables (e.g., current setpoint temperature versus learning status) or variable values (e.g., 65 degrees versus 75 degrees) may be displayed. The one being displayed may depend on a user's rotation of the outer rotatable ring 1012. Thus, for example, when the device is configured to display a current setpoint temperature, the value being displayed may gradually increase as the user rotates the ring in a clockwise direction. The sign of the change in the displayed temperature may depend on whether the user is rotating the ring in a clockwise or counterclockwise direction. The speed at which the displayed temperature is changing may depend (e.g., in a linear manner) on the speed at which the user is rotating the ring.

As described above, a displayed characteristic may vary depending on received user input. For example, a displayed temperature may increase as a user rotates the outer rotatable ring 1012 clockwise, or a highlighted indicator may progress across a list of displayed options as the user rotates the ring 1012. Further, or additionally, user inputs may cause the appearance of new types of information. For example, if a user is viewing setpoint-temperature options, a dramatic clockwise rotation may cause a flashing red symbol (to convey an anti-environmental message). Thus, a relationship may exist between a single type of user input (e.g., ring rotation) and a change in an active variable (e.g., setpoint temperature changes), and relationships may further exist between the single type of user input and an inactive variable (e.g., an environmental warning flag). The latter relationship may be indirect and depend on a value or change in values of the active variable.

The presentations on the electronic display 1016 may depend on one or more types of user input. For example, the display may change in a first manner (e.g., to show a varying selection option) as a user rotates the outer rotatable ring 1012 and may change in a second manner (e.g., to confirm a selection or default to a menu screen) as the user exerts inwards pressure on the outer rotatable ring 1012.

According to some embodiments, metallic portion 1024 has number of slot-like openings so as to facilitate the use of a passive infrared motion sensor 1030 mounted therebeneath. The metallic portion 1024 can alternatively be termed a metallic front grille portion. Further description of the metallic portion/front grille portion is provided in the commonly assigned U.S. Ser. No. 13/199,108. The design of the metallic portion 1024 compliments the sleek, simple, uncluttered and elegant design of smart thermostat 102 while facilitating the integration and operation of sensors located within a housing of the thermostat. In the implementation as illustrated, smart thermostat 102 is enclosed by housing with a forward-facing surface including the cover 1014 and the metallic portion 1024. Some implementations of the housing include a back plate and a head unit. The housing provides an attractive and durable configuration for one or more integrated sensors used by smart thermostat 102 and contained therein. In some implementations, the metallic portion 1024 may be flush-mounted with the cover 1014 on the forward-facing surface of housing. Together the metallic portion 1024 as incorporated in housing does not detract from home or commercial decor, and indeed can serve as a visually pleasing centerpiece for the immediate location in which it is located.

The metallic portion 1024 is designed to conceal sensors from view promoting a visually pleasing quality of the thermostat yet permitting them to receive their respective signals. Openings in the metallic portion 1024 along the forward-facing surface of the housing allow signals to pass through that would otherwise not pass through the cover 1014. For example, glass, polycarbonate or other similar materials used for cover 1014 are capable of transmitting visible light but are highly attenuating to infrared energy having longer wavelengths in the range of 10 microns, which is the radiation band of operation for many passive infrared (PIR) occupancy sensors. Notably, included in the smart thermostat 102, according to some preferred implementations, is an ambient light sensor (not shown) and an active proximity sensor (not shown) positioned near the top of the thermostat just behind the cover 1014. Unlike PIR sensors, the ambient light sensor and active proximity sensor are configured to detect electromagnetic energy in the visible and shorter-infrared spectrum bands having wavelengths less than 1 micron, for which the glass or polycarbonate materials of the cover 1014 are not highly attenuating. In some implementations, the metallic portion 1024 includes openings in accordance with one or more implementations that allow the longer-wavelength infrared radiation to pass through the openings towards a passive infrared (PIR) motion sensor 1030 as illustrated. Because the metallic portion 1024 is mounted over the radiation receiving surface of PIR motion sensor 1030, PIR motion sensor 1030 continues to receive the longer wavelength infrared radiation through the openings and detect occupancy in an enclosure.

Additional implementations of the metallic portion 1024 also facilitate additional sensors to detect other environmental conditions. The metallic portion may at least partly conceal and/or protect one or more such sensors. In some implementations, the metallic portion 1024 helps a temperature sensor situated inside of the thermostat's housing measure the ambient temperature of air. Openings in the metallic portion 1024 promote air flow towards a temperature sensor located below the metallic portion 1024 thus conveying outside temperatures to the interior of the housing. In further implementations, the metallic portion 1024 may be thermally coupled to a temperature sensor promoting a transfer of heat from outside the housing.

The smart thermostat 102 is preferably constructed such that the electronic display 1016 is at a fixed orientation and does not rotate with the outer ring 1012, so that the electronic display 1016 remains easily read by the user. For some embodiments, the cover 1014 and metallic portion 1024 also remain at a fixed orientation and do not rotate with the outer ring 1012. According to one embodiment in which the diameter of the smart thermostat 102 is about 80 mm, the diameter of the electronic display 1016 is about 45 mm. According to some embodiments an LED indicator 1080 is positioned beneath portion 1024 to act as a low-power-consuming indicator of certain status conditions. For, example the LED indicator 1080 can be used to display blinking red when a rechargeable battery of the thermostat is very low and is being recharged. More generally, the LED indicator 1080 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430, supra. According to some embodiments, occupancy information is used in generating an effective and efficient scheduled program. Preferably, an active proximity sensor 1070A is provided to detect an approaching user by infrared light reflection, and an ambient light sensor 1070B is provided to sense visible light. The proximity sensor 1070A can be used to detect proximity in the range of about one meter so that the smart thermostat 102 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat.

Further, the wake-up-on-proximity functionality also allows for energy savings within the thermostat by "sleeping" when no user interaction is taking place our about to take place. The ambient light sensor 1070B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the smart thermostat 102 is controlled by only two types of user input, the first being a rotation of the outer ring 1012 as shown in FIG. 10A (referenced hereafter as a "rotate ring" or "ring rotation" input), and the second being an inward push on an outer cap 1008 (see FIG. 10B) until an audible and/or tactile "click" occurs (referenced hereafter as an "inward click" or simply "click" input). For the embodiment of FIGS. 10A-10B, the outer cap 1008 is an assembly that includes all of the outer ring 1012, cover 1014, electronic display 1016, and metallic portion 1024. When pressed inwardly by the user, the outer cap 1008 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 10A-10B, an inward click can be achieved by direct pressing on the outer ring 1012 itself, or by indirect pressing of the outer ring by virtue of providing inward pressure on the cover 1014, metallic portion 1024, or by various combinations thereof. For other embodiments, the smart thermostat 102 can be mechanically configured such that only the outer ring 1012 travels inwardly for the inward click input, while the cover 1014 and metallic portion 1024 remain motionless. It is to be appreciated that a variety of different selections and combinations of the particular mechanical elements that will travel inwardly to achieve the "inward click" input are within the scope of the present teachings, whether it be the outer ring 1012 itself, some part of the cover 1014, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 1012 has been found particularly advantageous, since the user's fingers do not need to be lifted out of contact with the device, or slid along its surface, in order to go between ring rotations and inward clicks. Moreover, by virtue of the strategic placement of the electronic display 1016 centrally inside the rotatable ring 1012, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra, U.S. Ser. No. 29/386,021, supra, and U.S. Ser. No. 13/199,108.

Figure 10C:
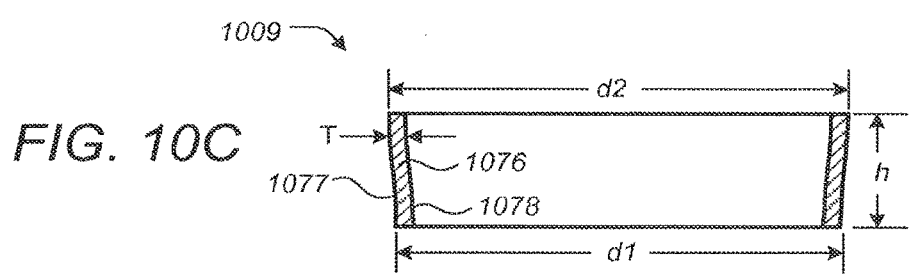

FIG. 10C illustrates a cross-sectional view of a shell portion 1009 of a frame of the thermostat of FIGS. 10A-B, which has been found to provide a particularly pleasing and adaptable visual appearance of the overall smart thermostat 102 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 1009 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 1009 has the shape of a frustum that is gently curved when viewed in cross-section, and comprises a sidewall 1076 that is made of a clear solid material, such as polycarbonate plastic. The sidewall 1076 is backpainted with a substantially flat silver- or nickel-colored paint, the paint being applied to an inside surface 1078 of the sidewall 1076 but not to an outside surface 1077 thereof. The outside surface 1077 is smooth and glossy but is not painted. The sidewall 1076 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 10C. The outer ring 1012 of outer cap 1008 is preferably constructed to match the diameter d2 where disposed near the second end of the shell portion 1009 across a modestly sized gap g1 therefrom, and then to gently arc back inwardly to meet the cover 1014 across a small gap g2. It is to be appreciated, of course, that FIG. 10C only illustrates the outer shell portion 1009 of the smart thermostat 102, and that there are many electronic components internal thereto that are omitted from FIG. 10C for clarity of presentation, such electronic components being described further hereinbelow and/or in other ones of the commonly assigned incorporated applications, such as U.S. Ser. No. 13/199,108.

According to some embodiments, the smart thermostat 102 includes a processing system 1060, display driver 1064 and a wireless communications system 1066. The processing system 1060 may be disposed within a housing of smart thermostat 102, coupled to one or more temperature sensors of smart thermostat 102 and/or coupled to rotatable ring 1012. The processing system 1060 may be configured to dynamically identify user input via rotatable ring 1012, dynamically identifying a variable value (e.g., a setpoint temperature value), and/or dynamically identify an HVAC-control-related property. The processing system 1060 may be configured and programmed to provide an interactive thermostat menuing system (e.g., such as the menuing system shown in FIG. 5) on display area 1016 responsive to an inward pressing of rotatable ring 1012 and/or to provide user navigation within the interactive thermostat menuing system based on rotation of rotatable ring 1012 and inward pressing of rotatable ring 1012 (e.g., such as is described in relation to FIG. 5). The processing system 1060 may be adapted to cause the display driver 1064 and display area 1016 to display information to the user and/or to receive user input via the rotatable ring 1012.

For example, an active variable (e.g., variable-value selection, setpoint selection, zip-code selection) may be determined based on a default state, smart logic or previously received user input. A relationship between the variable and user input may be identified. The relationship may be, e.g., linear or non-linear, continuous or discrete, and/or saturating or non-saturating. Such relationships may be pre-defined and stored within the thermostat. User input may be detected. Analysis of the user input may include, e.g., identifying: a type of user input (tapping versus rotation), a degree of input (e.g., a degree of rotation); a final input position (e.g., a final angular position of the rotatable ring); an input location (e.g., a position of a tapping); and/or a speed of input (e.g., a speed of rotation). Using the relationship, the processing system 1060 may then determine a display indicator, such as a digital numerical value representative of an identified value of a variable (e.g., a setpoint temperature). The display indicator may be displayed on display area 1016. For example, a digital numerical value representative of a setpoint temperature to be displayed may be determined based on a prior setpoint value and a saturating and continuous relationship between rotation input and the temperature. The displayed value may be, e.g., numeric, textual or graphical.

The processing system 1060 may further set a variable value in accordance with a user selection. For example, a particular type of user input (e.g., inwards pressure exertion) may be detected. A value of a selected variable may be determined based on, e.g., a prior ring rotation, displayed variable value, etc. The variable may then be set to this value.

The processing system 1060, according to some embodiments, is capable of carrying out the governance of the operation of smart thermostat 102 including the user interface features described herein. The processing system 1060 is further programmed and configured to carry out other operations as described further hereinbelow and/or in other ones of the commonly assigned incorporated applications. For example, processing system 1060 is further programmed and configured to maintain and update a thermodynamic model for the enclosure in which the HVAC system is installed, such as described in U.S. Ser. No. 12/881,463. According to some embodiments, the wireless communications system 1066 is used to communicate with devices such as personal computers and/or other thermostats or HVAC system components, which can be peer-to-peer communications, communications through one or more servers located on a private network, and/or communications through a cloud-based service.

It should be appreciated that the smart thermostat 102 could be equipped with a tactile mechanical feedback feature for providing software-triggered mechanical feedback to encourage energy efficient user behavior. For example, in the event a user attempts to input an ill-advised temperature setting (e.g., a setting that consumes a large amount of energy), the tactile mechanical feedback features provide the user with negative mechanical feedback, such as by vibrating, making the ring hard or impossible to turn.

Further, it should be appreciated that any of the smart devices described herein, such as the smart hazard detector, the smart thermostat, the smart wall switch, the smart doorbell, could have means for self-generating power and optionally storing the generated power in a local battery. For example, in some embodiments, the smart devices include a Peltier Junction for generating power. In these embodiments, for example, the Peltier Junction generates electricity from heat differentials created between the smart device and its mounting location, such as when the smart device gets hot from use. In other embodiments, the smart devices are equipped with generators, such as piezoelectric devices that generate electricity when the device is physically used, such as when a user turns the ring on the smart thermostat. While piezoelectric devices are used in this example, it should be appreciated that any generator devices known to those having skill in the art could be used.

Figure 11:
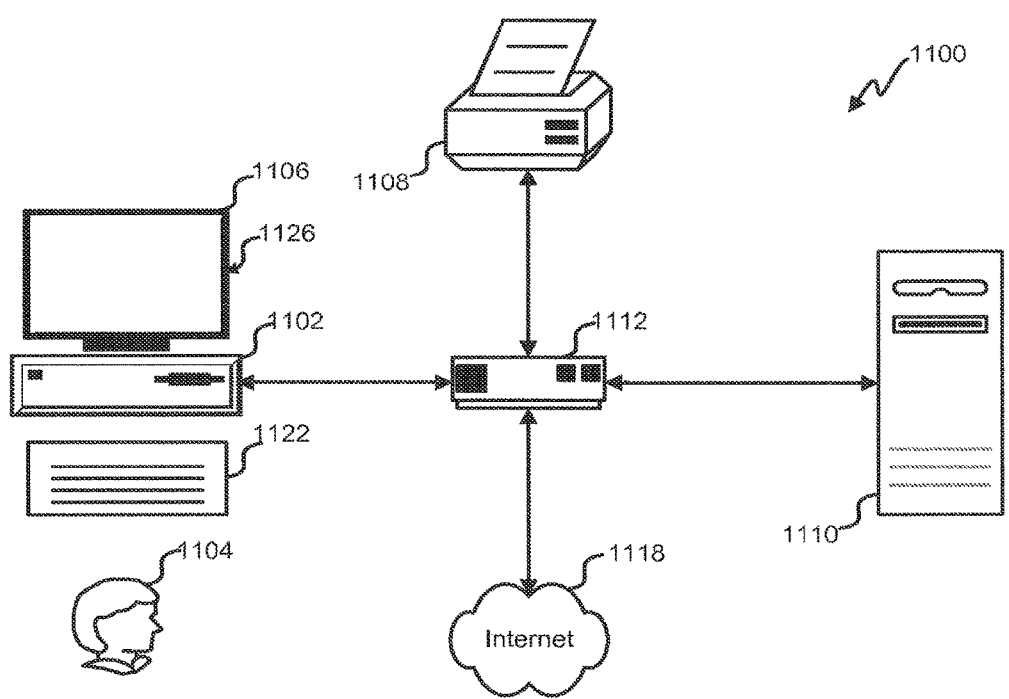
FIG. 11 illustrates a block diagram of embodiments of a computer system.

Referring next to FIG. 11, an exemplary environment with which embodiments may be implemented is shown with a computer system 1100 that can be used by a user 1104 to remotely control, for example, one or more of the sensor-equipped smart-home devices according to one or more of the embodiments. The computer system 1110 can alternatively be used for carrying out one or more of the server-based processing paradigms described hereinabove, can be used as a processing device in a larger distributed virtualized computing scheme for carrying out the described processing paradigms, or for any of a variety of other purposes consistent with the present teachings. The computer system 1100 can include a computer 1102, keyboard 1122, a network router 1112, a printer 1108, and a monitor 1106. The monitor 1106, processor 1102 and keyboard 1122 are part of a computer system 1126, which can be a laptop computer, desktop computer, handheld computer, mainframe computer, etc. The monitor 1106 can be a CRT, flat screen, etc.

A user 1104 can input commands into the computer 1102 using various input devices, such as a mouse, keyboard 1122, track ball, touch screen, etc. If the computer system 1100 comprises a mainframe, a designer 1104 can access the computer 1102 using, for example, a terminal or terminal interface. Additionally, the computer system 1126 may be connected to a printer 1108 and a server 1110 using a network router 1112, which may connect to the Internet 1118 or a WAN.

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the computer system 1126. Therefore, in this embodiment, the software can be used whether or not computer 1102 is connected to network router 1112. Printer 1108 may be connected directly to computer 1102, in which case, the computer system 1126 can print whether or not it is connected to network router 1112.

Figure 12:
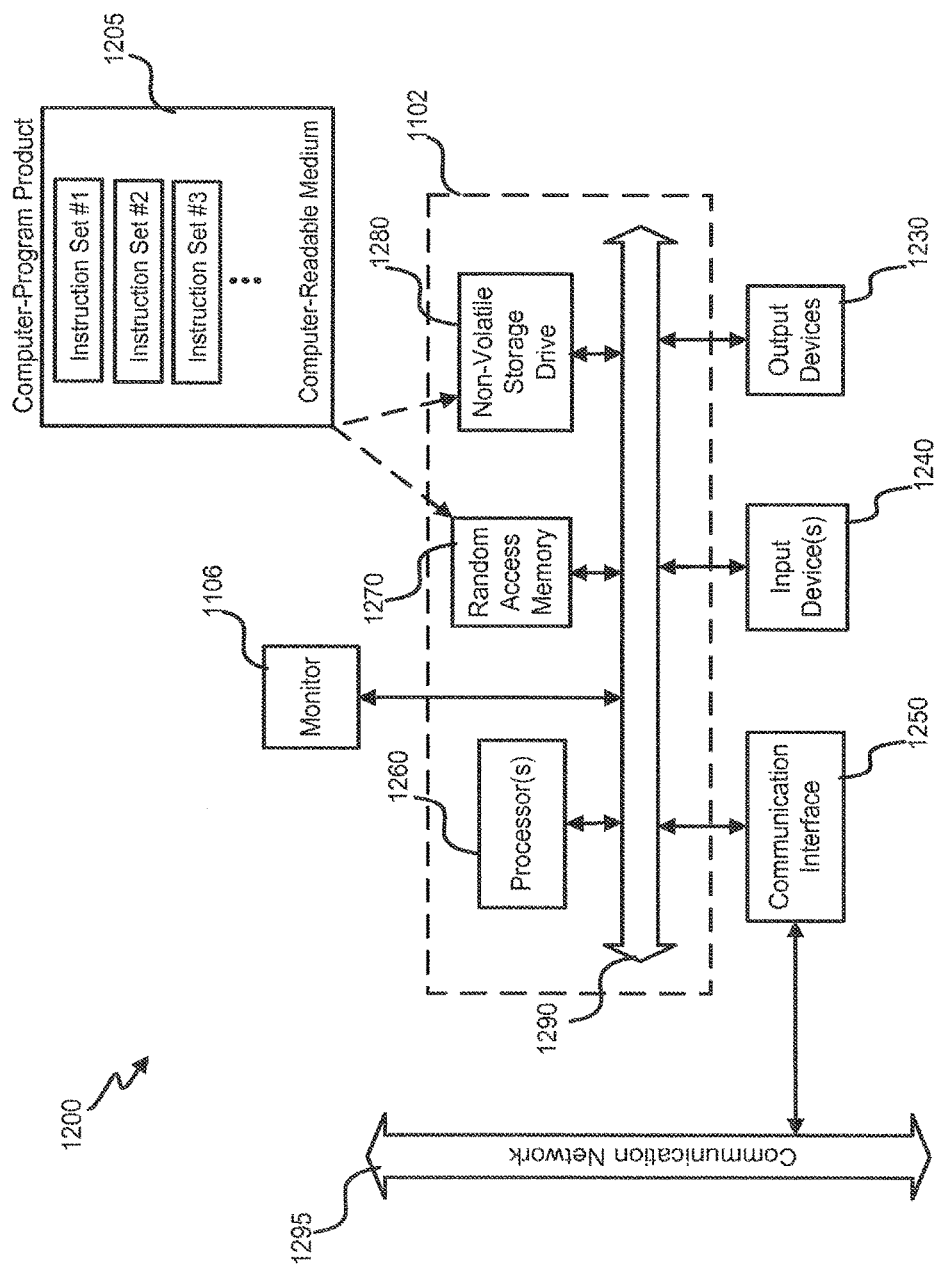
FIG. 12 illustrates a block diagram of embodiments of a special-purpose computer.

With reference to FIG. 12, an embodiment of a special-purpose computer system 1200 is shown. For example, one or more of intelligent components 116, processing engine 306 and components thereof may be a special-purpose computer system 1200. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1126, it is transformed into the special-purpose computer system 1200.

Special-purpose computer system 1200 comprises a computer 1102, a monitor 1106 coupled to computer 1102, one or more additional user output devices 1230 (optional) coupled to computer 1102, one or more user input devices 1240 (e.g., keyboard, mouse, track ball, touch screen) coupled to computer 1102, an optional communications interface 1250 coupled to computer 1102, a computer-program product 1205 stored in a tangible computer-readable memory in computer 1102. Computer-program product 1205 directs system 1200 to perform the above-described methods. Computer 1102 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1102 and loaded into memory 1270. Each processor 1260 may comprise a microprocessor, such as a microprocessor from Intel® or Advanced Micro Devices, Inc.®, or the like. To support computer-program product 1205, the computer 1102 runs an operating system that handles the communications of product 1205 with the above-noted components, as well as the communications between the above-noted components in support of the computer-program product 1205. Exemplary operating systems include Windows®. or the like from Microsoft Corporation, Solaris® from Sun Microsystems, LINUX, UNIX, and the like.

User input devices 1240 include all possible types of devices and mechanisms to input information to computer system 1102. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1106 via a command such as a click of a button or the like. User output devices 1230 include all possible types of devices and mechanisms to output information from computer 1102. These may include a display (e.g., monitor 1106), printers, non-visual displays such as audio output devices, etc.

Communications interface 1250 provides an interface to other communication networks and devices and may serve as an interface to receive data from and transmit data to other systems, WANs and/or the Internet 1118. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1102, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1102 communicate with each other as intended. Although bus subsystem 1290 is shown schematically as a single bus, alternative embodiments of the bus subsystem may utilize multiple busses or communication paths within the computer 1102.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Figure 13:
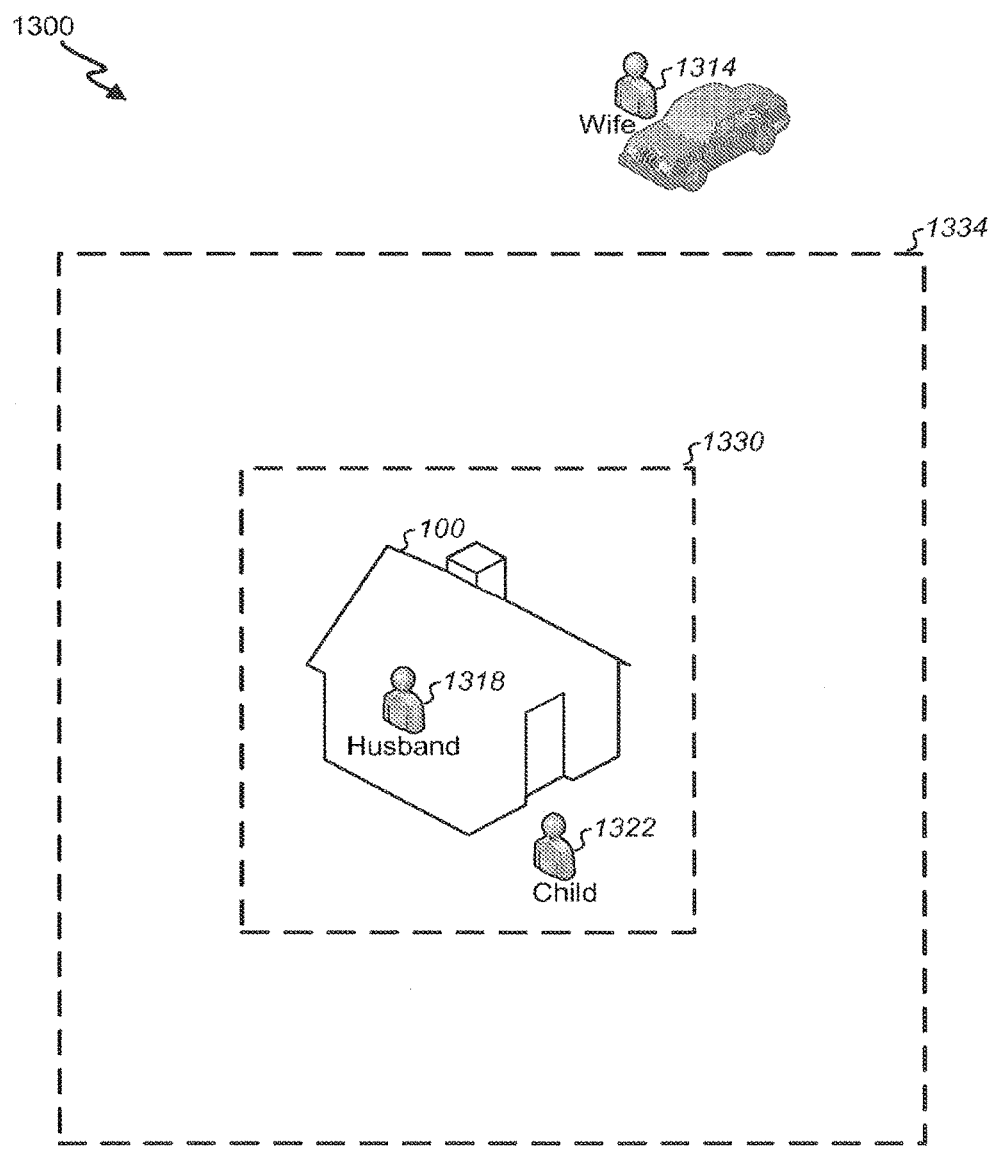
FIG. 13 is a schematic diagram illustrating example geo-fencing, according to embodiments.

Referring now to FIG. 13, provided according to some embodiments are systems and methods for achieving smart-home objectives using occupant-location data (e.g., GPS data). According to embodiments, occupant-location data— in addition to other data obtained from smart home devices—is provided to the central server or cloud-computing system 164, which uses the data to make inferences regarding the current and future occupancy of the home and/or rooms, and to control the smart devices inside the home in a corresponding manner. Further, according to embodiments, provided are systems and methods for conflict sensing and resolution for accommodating multiple occupants in the smart-home environment 100, which has occupant-location based controls of the smart home devices, such as temperature adjustments via the smart thermostat. For example, as described below, the systems and methods identify conflicts in the preferences (e.g., preferred temperature settings) of the occupants of the home and resolves the conflicts based on prescribed or learned rules, such has giving priority to the preferences of some occupants.

According to embodiments, the central server or cloud-computing system 164 obtains occupant-location data, such as GPS data, from the mobile devices 166 of the occupants. For example, the occupants of a home (e.g., the individuals who live in or frequently visit the home) register their respective mobile devices 166 as being associated with the home.

In some instances the central server or cloud-computing system 164 receives occupant-location data directly from the mobile devices, whereas in others the data is received from an intermediary, such as one of the smart devices in the home.

In instances where occupant-location data is received directly from the mobile device, the central server or cloud-computing system 164 can determine if the occupant is "at home" or "away", as explained below. When an occupant is at home, the central server or cloud-computing system 164 can determine the occupant's actual room-location (e.g., bedroom, kitchen, garage, etc.). To do, for example, the central server or cloud-computing system 164 cross-references the occupant-location (e.g., GPS coordinates) with a map of the home.

In instances where occupant-location data is received from smart devices, the central server or cloud-computing system 164 can infer that the occupant is inside the home. Further, the room-location of the occupants can be determined. For example, the smart wall switches, the smart wall plugs, the smart doorbells, and other smart devices in the smart-home environment 100 detect the presence of the mobile device 166 and transmit corresponding data to the central server or cloud-computing system 164. Such detection of mobile devices can be accomplished using WiFi, Bluetooth, NFC, etc. It should also be appreciated that passive RFID tags can be used to determine the room-location of occupants (and pets). For example, an RFID is associated with each of the occupants (and pets) of the house, such as by including the tags in wallets, bracelets, wristbands, mobile devices, collars, etc. The smart devices in the various rooms detect the RFID tags, and send that information to the central server or cloud-computing system 164. It should be appreciated that, because they are typical mounted in unobstructed locations, high on walls of often-occupied rooms, smart hazard detectors 104 are particularly well suited for RFID sensors.

In the illustrated example, the occupants include Wife 1314, Husband 1318 and Child 1322, all of whom have registered their mobile device 166 with the central server or cloud-computing system 164 as being associated with the smart-home environment 100. Further, two geo-location boundaries or "geo-fences" 1330, 1334 are registered as being associated with the smart-home environment 100. In some embodiments, the occupants of the home define and register the geo-fences, while in other embodiments the central server or cloud-computing system 164 auto-generates the geo-fences for the home.

Inner geo-fence 1330 defines the perimeter of living area of the home. The area within the inner-geo fence includes not only the home but also the land immediately surrounding the house, including any closely associated structures, such as garages or sheds ("the cartilage"). Outer geo-fence 1334 defines an outer perimeter, which is sometimes miles from the home. The outer geo-fence 1334 is adjustable and extends well beyond the curtilage. For example, the perimeter defined by the outer geo-fence 1334 may have a radius of two to three miles in some embodiments, while in other embodiments the radius is larger or smaller.

According to embodiments, the central server or cloud-computing system 164 infers that an occupant is "at home" when inside the inner geo-fence 1330 and that the occupant is "away" when outside of the inner geo-fence 1330. Further, the central server or cloud-computing system 164 infers an occupant is going home when the occupant moves (e.g., travels by car) from outside to inside the outer geo-fence 1334. As such, the central server or cloud-computing system 164 uses the inner geo-fence 1330 to determine when occupants leave the home, and it uses the outer geo-fence 1334 to determine when occupants are heading home.

Several exemplary smart-home objectives will now be described with reference to FIG. 13. In one example, the central server or cloud-computing system 164 predicts that Wife 1314 is going home, and makes adjustments in the smart-home environment 100 in anticipation of her arrival. In this example, Wife 1314 travels from outside to inside the outer geo-fence 1334, thereby triggering an indication that Wife is heading home. The Wife's speed and the distance between the fence and the home 100 is used to predict the Wife's time of arrival. Using this information central server or cloud-computing system 164 can prepare for Wife's arrival, such as by pre-heating or cooling some or all of the rooms in the home 100 to Wife's preferred temperature. Time-to-temperature calculations can be used to make the pre-cooling or heading as efficient as possible, and to ensure Wife's preferred temperature is achieved before she arrives. In the event neither Husband 1318 nor Child 1322 is home, all rooms are pre-heated or cooled. However, if either or both Husband 1318 and Child 1322 are home, rooms associate with Wife can be pre-heated or cooled to Wife's desired temperature, while other rooms are set to temperatures based the preferences of Husband 1318 and/or Child 1322. Rooms associated with Wife can be inferred by the central server or cloud-computing system 164 based on historical occupancy and usage data, as well as based on a set of rules provided by the occupants (see below).

In another example, the central server or cloud-computing system 164 determines that the home 100 is vacant because all occupants (Wife 1314, Husband 1318, and Child 1322) are outside of the inner geo-fence 1330. In this case, the central server or cloud-computing system 164 places the smart devices in their "away" settings. For example, the lights are turned off, the HVAC is set to a temperature that requires little or no heating or cooling, the alarm is armed, the doors are locked, electronics and appliances (e.g., televisions, stoves, space heaters, etc.) are turned off, etc. In the event, all occupants' mobile devices are outside of the inner geo-fence 1330 and movement is detected in the house, the central server or cloud-computing system 164 can infer the movement is the family dog and can apply the dog's smart devices settings.

In yet another example, Wife 1314, Husband 1318, and Child 1322 are all inside the inner geo-fence 1320. Applying the techniques described above, the central server or cloud-computing system 164 knows that Wife 1314 is in the master bedroom and that Husband 1318 and Child 1322 are both in the den (see discussion regarding "room-occupancy detection"). Accordingly, the central server or cloud-computing system 164 adjusts the temperature in the master bedroom to Wife's preferred setting, and it applies a set of rules to determine whether to set the den to the Husband's or the Child's preferred setting. The set of rule, for each room of the home, provide a prioritized list of occupants and their respective settings. For example, for the den, Wife's settings are highest priority, then Husband's, and then the Child's. Thus, in this case, Husband's setting are applied in the den because his setting are higher priority than Child's. However, if Wife were to later join them in the den, her setting would be applied instead of Husband's.

In still another example, Wife 1314, Husband 1318, and Child 1322 are all inside the inner geo-fence 1320. Wife and Husband are in the den, but Child is in the yard playing. The central server or cloud-computing system 164 applies the above-described techniques to determine that Wife and Husband are in the den. However, Child is unaccounted for in any of the rooms. In this example, Child was detected in the den earlier that day, and none of the occupants have traveled outside of the inner-fence 1334 that day. Using this information, the central server or cloud-computing system 164 infers that Child is in the yard, playing. Alternatively, the central server or cloud-computing system 164 infers that Child is in the yard because it received data from the smart doorbell that the child exited the house, yet it is also receiving data from Child's mobile device that Child is inside of the inner geo-fence 1330. Because the Child is in the yard, the central server or cloud-computing system 164 prevents the irrigation system from turning on and it broadcasts occasional reminders to Husband and Wife via speakers provided in the smart devices, for example.

In some embodiments, a system is provided for accomplishing an objective in a smart-home environment. This system comprises one or more low-powered nodes located in the smart-home environment, and one or more smart nodes located in the smart-home environment, where the low-powered and smart nodes communicatively interconnected for the purpose of accomplishing the objective in the smart-home environment. In some embodiments, at least one of the low-powered and smart nodes is configured to monitor a condition of the smart-home environment, and transmit to at least one of the other low-powered and smart nodes a message having information related to the condition of the smart-home environment.

In some embodiments, responsive to receiving a message having information related to a condition of the smart-home environment, at least one of the smart nodes is configured to determine an objective that is to be accomplished in the smart-home environment and that is appropriate in light of the condition, determine a function to be performed in the smart-home environment for the purpose of accomplishing the objective, and transmit to the other low-powered and smart nodes of the smart-home environment instructions to perform the function in the smart-home environment for the purpose of accomplishing the objective. In some embodiments, responsive to receiving a message having information related to a condition of the smart-home environment, at least one of the smart nodes can be configured to transmit to a server a message having information related to a condition of the smart-home environment. In some embodiments, responsive to receiving a message having information related to the condition of the smart-home environment, the server is configured to determine an objective that is to be accomplished in the smart-home environment and that is appropriate in light of the condition, determine a function to be performed in the smart-home environment for the purpose of accomplishing the objective, and transmit to at least one of the smart nodes of the smart-home environment instructions to perform the function in the smart-home environment for the purpose of accomplishing the objective.

In some embodiments, the low-powered nodes are capable of communicating using a first wireless protocol characterized by relatively low power usage and relatively low data rates, and the smart nodes are capable of communicating using the first wireless protocol and a second wireless protocol characterized by relatively higher power usage and relatively higher data rates. In some embodiments, when transmitting to a server a message having information related to a condition of the smart-home environment, at least one of the smart nodes serves as a communication bridge to a wide area network using the second wireless protocol characterized by relatively higher power usage and relatively higher data rates.

In some embodiments, the smart nodes are smart devices, such as a hazard detector unit, a doorbell, a thermostat, a wall switch, or a wall plug. In some embodiments, the low-powered nodes are smart devices. In some embodiments, the smart the smart devices are identical and capable of performing as the low-powered node and the smart node. In some embodiments, the condition is a temperature, an amount of light, a sound, a movement, a vibration, a smell, a toxin, or an amount of heat. In some embodiments, the function and corresponding objective are triggering an alarm to secure the smart-home environment, adjusting a thermostat setting to make the smart-home environment comfortable, or turning on or off a light to secure the smart-home environment or for use by occupants of the smart-home environment.

In some embodiments, a method is provided that comprises monitoring, by one or more communicatively interconnected low-powered and smart nodes, a condition of a smart-home environment; transmitting, by at least one of the low-powered and smart nodes, a message having information related to the condition of the smart-home environment; receiving, by at least one of the smart nodes, a message having information related to the condition in the smart-home environment; determining, by at least one of the smart nodes based at least in part on the information related to the condition, a function to be performed in the smart-home environment; and transmitting, by at least one of the smart nodes, a message that causes at least one of the low-powered and smart nodes to perform the function in the smart-home environment. In some embodiments, the low-powered nodes are capable of communicating using a first wireless protocol characterized by relatively low power usage and relatively low data rates, and the smart nodes are capable of communicating using the first wireless protocol and a second wireless protocol characterized by relatively higher power usage and relatively higher data rates.

In some embodiments, the method further comprises transmitting, by at least one of the low-powered and smart nodes, a message having information related to the condition of the smart-home environment involves "repeating" the message to the other low-powered and smart nodes in the smart-home environment. In some embodiments, the smart nodes are smart devices, such as a hazard detector unit, a doorbell, a thermostat, a wall switch, or a wall plug. In some embodiments, the low-powered nodes are smart devices. In some embodiments, the smart devices are identical and capable of performing as the low-powered node and the smart node.

In some embodiments, a home automation system is provided that comprises a home security system including one or more sensor nodes capable of detecting motion within a home, and a service robot system including at least one service robot that autonomously moves within the home to perform one or more functions, where the home security system and the service robot system are mutually configured such that there will not be a motion alarm set off by the robot when the robot moves within a range of the one or more sensor nodes. In some embodiments, the system further comprises a computing device provided in operative communication with the home security system and the service robot system, where the computing device configured to receive in-home location coordinates from the robot, and distinguish between activity associated with the robot and unexpected intrusion activity by using the in-home location coordinates to filter signals from the one more sensor nodes. In some embodiments, the computing device is an on-site computing device. In some embodiments, the computing device is a remote server.

In some embodiments, the robot outputs a signal when moving to alert the home security system to its presence so that there will not be a motion alarm set off for as long as the signal is detected by the one or more sensor nodes. In some embodiments, the signal is authenticated and encrypted such that the signal cannot be learned and replicated by a potential burglar. In some embodiments, signal authentication and encryption is accomplished by a permission request-response scheme, where the service robot system requests permission from home security system when the service robot system is ready to deploy the robot to perform the one or more functions. In some embodiments, the service robot system does not deploy the robot until receiving a "yes" message from home security system. In some embodiments, the signal is one or more of an optical notifying signal, an audible notifying signal, an infrared notifying signal, an infrasonic notifying signal, or a wirelessly transmitted data notification signal. In some embodiments, the one or more functions performed by the robot include one or more of floor sweeping, floor washing, playing music for an occupant, serving as a localized thermostat for an occupant, serving as a localized air monitor/purifier for an occupant, serving as a localized baby monitor, or serving as a localized hazard detector for an occupant.

In some embodiments, a wall switch controller is provided that comprises a docking station configured to receive a user-removable wall-switch head unit, the docking station configured to be permanently connected to a wall and coupled to high-power voltage wires, and a user-removable wall-switch head unit configured to be user-insertable into said docking station and user-removable therefrom such that the user is not exposed to high-voltage connections when inserting or removing. In some embodiments, the wall switch controller further comprises inputs and outputs and circuitry for switchably controlling household line current power to at least one household electrical fixture. In some embodiments, the wall switch controller further comprises one or more of an occupancy sensor, a temperature sensor, or a processor. In some embodiments, the wall switch controller further comprises circuitry for leveraging electrical power from the household line current power inputs to power one or more of the occupancy sensor, the temperature sensor, or the processor.

In some embodiments, the wall switch controller further comprises wireless communication circuitry configured to communicate with a plurality of low-powered devices using a first wireless protocol characterized by relatively low power usage and relatively lower data rates and to serve as a communications bridge to a wide area network using a second wireless protocol characterized by relatively higher power usage and relatively higher data rates, and a power storage module for storing power and using the power to maintain wireless communications during a power outage. In some embodiments, the wall switch controller further comprises a housing configured to be compatible for installation in a conventional single-gang or multiple-gang wall box.

In some embodiments, a method is provided for providing an alarm clock in a smart-home environment, and the method comprises obtaining, at a server, a wake time for an occupant of the smart-home environment, and instructing, by the server, one or more smart devices in the smart-home environment to output an audible alarm when the wake time occurs. In some embodiments, obtaining a wake time comprises obtaining over a period, from one or more motion-sensing smart devices located in the smart-home environment, data related to movement of the occupant in response to an alarm, and inferring, by the server, a wake time based at least in part on the data related to movement of the occupant in response to an alarm over the period. In some embodiments, the method further comprises tracking, by the one or more motion-detecting smart devices, movement of the occupant between one or more locations within the smart-home environment; detecting when the occupant stops moving for a period; and inferring that the occupant has fallen asleep at a location within the smart-home environment.

In some embodiments, the method further comprises inferring where and when the occupant prefers to sleep. In some embodiments, instructing one or more smart devices in the smart-home environment to output an audible alarm when the wake time occurs, comprises instructing only the one of the one or more smart devices that is closest to the occupant to output the audible alarm. In some embodiments, tracking a location of the occupant within the smart-home environment, comprises generating a unique signature for the occupant based at least in part of data obtained from the one or more smart devices, and using the unique signature to distinguish the occupant from other occupants of the smart-home environment. In some embodiments, the unique signature of the occupant is based on one or more of a walking gate, patterns of movement, voice, height, or size. In some embodiments, the data that is obtained from the one or more smart devices and that is used to generate the unique signature of obtained from at least one of an ultrasonic sensor and a passive IR sensor included in the one or more motion-detecting smart devices.

In some embodiments, the method further comprises transmitting, to a thermostat, instructions to heat or cool the smart-home environment to a desired "sleeping" temperature setting when the occupant is determined to be sleeping. In some embodiments, the method further comprises transmitting, to a thermostat, instructions to heat or cool the smart-home environment to a desired "awake" temperature setting when the occupant is not determined to be sleeping. In some embodiments, the desired "sleeping" and "awake" temperature settings can be learned over time, such as be observing which temperature the occupant sets the thermostat to before going to sleep and which temperature the occupant sets the thermostat to upon waking up. In some embodiments, the method further comprises transmitting, to a thermostat, instructions to pre-heat or pre-cool the smart-home environment to a desired "awake" temperature setting in anticipation of the occupant waking up.

In some embodiments a method is provided that comprises obtaining, at a server from one or more smart devices located in one or more smart-home environments, home data collected from the smart-home environments by one or more sensors of the smart devices; and exposing, by the server, one or more application program interfaces for access by one or more service-provider entities to obtain the home data for the purpose of optimizing one or more home services provided by the one or more service-provider entities to the one or more smart-home environments. In some embodiments, the data includes at least one of smart device usage patterns and occupant presence patterns. In some embodiments, the server derives aggregate patterns from the home data. In some embodiments, the server provides neighborhood-level probabilities regarding whether occupants may be currently present in the smart-home environments. In some embodiments, the one or more home services being optimized are delivery services whose effectiveness is improved when the occupants are at home. In some embodiments, the application program interfaces anonymize the home data such that any one of the smart-home environments is not identifiable. In some embodiments, the one or more home services being optimized are not functionally related to the home data being collected by the one or more smart sensors.

In some embodiments a home monitoring and control system is provided that comprises a plurality of hazard detectors with wireless capability and occupancy detectors and audio speakers, and a doorbell having a processor and wireless capability, where a doorbell-ringing event triggers the processor to cause the doorbell to wirelessly communicate with one or more of the hazard detectors to cause the audio speakers to alert occupants of a visitor at the door. In some embodiments, each hazard detector can be configured with a do-not-disturb setting such that it will remain silent under one or more pre-determined conditions. In some embodiments, the pre-determined conditions include one or more of an occupant determined to be sleeping proximate to the hazard detector, room location of hazard detector is unoccupied, hazard detector is located in an occupied bedroom; or hazard detector is located in a kid's bedroom.

What is claimed is:

1. A home monitoring and control system, comprising:
    a doorbell installed at a door of a home including:
        a button configured to, upon being touched, depressed or activated, wirelessly initiate a first communication to cause an audio speaker of an electronic device to sound an audible notification and/or a message to be sent to a monitoring device associated with an occupant of the home to indicate presence of a person at the door;
        a camera configured to capture video data within a field of view; and
        a processor and a communication component, wherein the processor is configured to cause the communication component to wirelessly stream via a remote server the video data captured by the camera to the monitoring device; and
    an application executable by the monitoring device, the application being configured to, when executed by the monitoring device, receive from the doorbell via the remote server at least a portion of the video data captured by the camera of the doorbell, and display the received video data captured by the camera of the doorbell;
    wherein the audio speaker is distinct from the doorbell, and is configured to communicate wirelessly with the doorbell to sound the audible notification in response to the first communication from the doorbell;
    wherein the remote server is located remotely from the doorbell, the monitoring device and the audio speaker, and the remote server is configured to:
        receive from the doorbell via the communication component the video data captured by the camera and streamed to the remote server;
        receive the message indicating the presence of the person at the door;
        store the received video data; and
        relay the received video data and the message to the monitoring device;
    wherein the audio speaker of the electronic device has a do-not-disturb setting defining one or more pre-determined conditions, and in accordance with the do-no-disturb setting, the audio speaker of the electronic device is configured to remain silent under the one or more pre-determined conditions.

2. The home monitoring and control system of claim 1, wherein:
    the electronic device includes a hazard detector;
    the first hazard detector includes the audio speaker and has wireless capability; and
    the first hazard detector is wirelessly coupled to the doorbell via one or more wireless networks.

3. The home monitoring and control system of claim 1, wherein the electronic device includes a first electronic device, further comprising:
    a second electronic device, wherein the second electronic device includes a second audio speaker and has wireless capability, and is configured to communicate wirelessly with the doorbell to sound a second audible notification in response to the doorbell being touched, depressed or activated, concurrently with the sounding of the audible notification by the audio speaker of the first electronic device.

4. The home monitoring and control system of claim 3, wherein the first electronic device is a first hazard detector, and the second electronic device is a second hazard detector distinct from the first hazard detector.

5. The home monitoring and control system of claim 1, wherein the monitoring device includes a wall switch, and the wall switch is configured to display the video data captured by the camera on a surface of the wall switch or project the video data in a 2D or 3D form.

6. The home monitoring and control system of claim 1, wherein the doorbell is configured to receive air quality information from a smart hazard detector via the remote server.

7. The home monitoring and control system of claim 1, wherein the doorbell further includes a speaker, and is configured to:
    in accordance with a determination that the person is within a predetermined distance from the door, broadcast via the speaker a question asking whether the person is a delivery person;
    receive a response from the person via a microphone of the doorbell; and
    in accordance with a determination that the person is a delivery person based on the response, present a user instruction to instruct the person to place a package to be delivered in a location proximate to the doorbell.

8. The home monitoring and control system of claim 7, wherein the doorbell further includes a scanner configured to scan a bar code or a tag identifying the package being delivered by the person.

9. The home monitoring and control system of claim 1, wherein the doorbell further includes a speaker, and is configured to:
   in response to a detection via the remote server that an unknown individual is approaching the home, broadcast to the unknown individual via the speaker an audible notice.

10. The home monitoring and control system of claim 1, wherein the monitoring device includes a mobile device associated with the occupant of the home.

11. The home monitoring and control system of claim 1, wherein the broadcasting of the audible notification is aborted in accordance with a determination that a baby is sleeping in a room where the audio speaker is located.

12. The home monitoring and control system of claim 1, wherein the doorbell includes an RFID scanner configured to scan a mobile phone of the person, and the monitoring device is configured to identify the person based on information collected by the RFID scanner and receive a user instruction to grant an access right to the person based on the information collected by the RFID scanner.

13. A home monitoring and control system, comprising:
   a doorbell installed at a door of a home including:
      a button configured to, upon being touched, depressed or activated, wirelessly initiate a first communication to cause an audio speaker of an electronic device to sound an audible notification and/or a message to be sent to a monitoring device associated with an occupant of the home to indicate presence of a person at the door;
      a camera configured to capture video data within a field of view; and
      a processor and a communication component, wherein the processor is configured to cause the communication component to wirelessly stream via a remote server the video data captured by the camera to the monitoring device; and
   an application executable by the monitoring device, the application being configured to, when executed by the monitoring device, receive from the doorbell via the remote server at least a portion of the video data captured by the camera of the doorbell, and display the received video data captured by the camera of the doorbell;
   wherein the audio speaker is distinct from the doorbell, and is configured to communicate wirelessly with the doorbell to sound the audible notification in response to the first communication from the doorbell;
   wherein the remote server is located remotely from the doorbell, the monitoring device and the audio speaker, and the remote server is configured to:
      receive from the doorbell via the communication component the video data captured by the camera and streamed to the remote server;
      receive the message indicating the presence of the person at the door;
      store the received video data; and
      relay the received video data and the message to the monitoring device;
   wherein the doorbell is configured to detect a visitor activity including whether the person is approaching or leaving the door and generate a security control signal to control settings of a security system according to the detected visitor activity.

14. The home monitoring and control system of claim 13, wherein the audio speaker of the electronic device has a do-not-disturb setting defining one or more pre-determined conditions, and in accordance with the do-no-disturb setting, the audio speaker of the electronic device is configured to remain silent under the one or more pre-determined conditions.

15. The home monitoring and control system of claim 14, wherein the one or more pre-determined conditions include one or more of:
   the occupant is determined to be sleeping proximate to the audio speaker;
   a room where the audio speaker of the electronic device is located is unoccupied;
   the audio speaker of the electronic device is located in an occupied bedroom; and
   the audio speaker of the electronic device is located in a kid's bedroom.

16. The home monitoring and control system of claim 13, wherein the doorbell is configured to in accordance with the settings of the security system:
   activate the security system when the person is approaching the door; and
   deactivate the security system when the person is leaving the door.

17. A home monitoring and control system, comprising:
   a doorbell installed at a door of a home including:
      a button configured to, upon being touched, depressed or activated, wirelessly initiate a first communication to cause an audio speaker of an electronic device to sound an audible notification and/or a message to be sent to a monitoring device associated with an occupant of the home to indicate presence of a person at the door;
      a camera configured to capture video data within a field of view;
      a rechargeable battery electrically coupled to a housing wire and configured to be charged via the housing wire; and
      a processor and a communication component, wherein the processor is configured to cause the communication component to wirelessly stream via a remote server the video data captured by the camera to the monitoring device; and
   an application executable by the monitoring device, the application being configured to, when executed by the monitoring device, receive from the doorbell via the remote server at least a portion of the video data captured by the camera of the doorbell, and display the received video data captured by the camera of the doorbell;
   wherein the audio speaker is distinct from the doorbell, and is configured to communicate wirelessly with the doorbell to sound the audible notification in response to the first communication from the doorbell;
   wherein the remote server is located remotely from the doorbell, the monitoring device and the audio speaker, and the remote server is configured to:
      receive from the doorbell via the communication component the video data captured by the camera and streamed to the remote server;
      receive the message indicating the presence of the person at the door;
      store the received video data; and relay the received video data and the message to the monitoring device;

wherein the doorbell is configured to charge the rechargeable battery during first time intervals, and the rechargeable battery is configured to discharge to power and enable operations of the doorbell during second time intervals, the first and second time intervals being determined based on power usage of the doorbell.

18. The home monitoring and control system of claim 17, wherein the doorbell is configured to charge the rechargeable battery during the first time intervals in which the power usage of the doorbell is less than a safe power level provided by the housing wire, and the rechargeable battery is configured to discharge to power and enable operations of the doorbell during second time intervals in which the power usage of the doorbell is greater than the safe power level provided by the housing wire.

19. A home monitoring and control system, comprising:
a doorbell installed at a door of a home including:
   a button configured to, upon being touched, depressed or activated, wirelessly initiate a first communication to cause an audio speaker of an electronic device to sound an audible notification and/or a message to be sent to a monitoring device associated with an occupant of the home to indicate presence of a person at the door;
   a camera configured to capture video data within a field of view; and
   a processor and a communication component, wherein the processor is configured to cause the communication component to wirelessly stream via a remote server the video data captured by the camera to the monitoring device; and an application executable by the monitoring device, the application being configured to, when executed by the monitoring device, receive from the doorbell via the remote server at least a portion of the video data captured by the camera of the doorbell, and display the received video data captured by the camera of the doorbell;

wherein the audio speaker is distinct from the doorbell, and is configured to communicate wirelessly with the doorbell to sound the audible notification in response to the first communication from the doorbell;

wherein the remote server is located remotely from the doorbell, the monitoring device and the audio speaker, and the remote server is configured to:
   receive from the doorbell via the communication component the video data captured by the camera and streamed to the remote server;
   receive the message indicating the presence of the person at the door;
   store the received video data; and
   relay the received video data and the message to the monitoring device;
wherein the remote server is configured to determine (1) whether a street adjacent to the home has a threshold level of traffic and (2) a safety level for children residing at the home based on the video data, and generate an alarm based on the determination.

20. The home monitoring and control system of claim 19, wherein the remote server is configured to in accordance with a determination that the street adjacent to the home has the threshold level of traffic, send an instruction to the electronic device to increase a volume level of the audio speaker.

* * * * *

UNITED STATES PATENT AND TRADEMARK OFFICE
CERTIFICATE OF CORRECTION

PATENT NO. : 10,393,590 B2  
APPLICATION NO. : 15/972750  
DATED : August 27, 2019  
INVENTOR(S) : Fadell et al.

Page 1 of 1

It is certified that error appears in the above-identified patent and that said Letters Patent is hereby corrected as shown below:

In the Claims

Claim 2, Column 58, Line 27, please delete "a hazard" and insert --a first hazard--.

Signed and Sealed this  
Twenty-sixth Day of November, 2019

Andrei Iancu  
*Director of the United States Patent and Trademark Office*